United States Patent
Hara

(10) Patent No.: US 7,278,215 B2
(45) Date of Patent: Oct. 9, 2007

(54) METHOD AND DEVICE FOR MEASURING WHEEL ALIGNMENT OF AUTOMOBILE

(75) Inventor: Kiyonobu Hara, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 10/564,724

(22) PCT Filed: Jul. 20, 2004

(86) PCT No.: PCT/JP2004/010594

§ 371 (c)(1),
(2), (4) Date: Jan. 17, 2006

(87) PCT Pub. No.: WO2005/010463

PCT Pub. Date: Feb. 3, 2005

(65) Prior Publication Data

US 2007/0112469 A1    May 17, 2007

(30) Foreign Application Priority Data

| Jul. 28, 2003 | (JP) | ............................ 2003-281298 |
| Jul. 28, 2003 | (JP) | ............................ 2003-281299 |
| Oct. 6, 2003 | (JP) | ............................ 2003-347424 |

(51) Int. Cl.
*G01B 21/26* (2006.01)

(52) U.S. Cl. .................... 33/203.15; 700/279

(58) Field of Classification Search ............... 33/203, 33/203.12, 203.15, 203.16, 203.17, 203.18, 33/203.19, 203.2, 203.21, 288, 600; 29/273; 700/279

See application file for complete search history.

(56) References Cited

U.S. PATENT DOCUMENTS

| RE33,144 E | * | 1/1990 | Hunter et al. ............ 33/203.18 |
| 5,724,743 A | * | 3/1998 | Jackson ...................... 33/288 |
| 6,313,911 B1 | * | 11/2001 | Stieff ...................... 33/203.12 |

(Continued)

FOREIGN PATENT DOCUMENTS

| JP | 4-313012 | 11/1992 |
| JP | 2002-181528 | 6/2002 |

*Primary Examiner*—G. Bradley Bennett
(74) *Attorney, Agent, or Firm*—Kratz, Quintos & Hanson, LLP

(57) ABSTRACT

There is provided a method and a device for measuring wheel alignment of an automobile that can quickly and precisely measure wheel alignment of the automobile without applying the same load to a wheel installation portion as that applied thereto in a finished vehicle state to improve productivity and can quickly reflect the result of wheel alignment measurement in a process of assembly of a suspension unit to the automobile. An automobile body 2 is supported in such a manner that a wheel installation portion 5 can be lifted and lowered, and the wheel installation portion 5 is lifted to a predetermined vertical position. During lift, a position of the wheel installation portion 5 and the toe angle and camber angle thereof at the position are measured. The toe angle and the camber angle are corrected based on a thrust angle and an attitude angle. From the corrected toe angle and camber angle, the toe angle and the camber angle of the wheel installation portion 5 at the position thereof in the finished vehicle state of the automobile are calculated.

15 Claims, 12 Drawing Sheets

U.S. PATENT DOCUMENTS

| | | |
|---|---|---|
| 6,404,486 B1* | 6/2002 | Nobis et al. ............. 33/203.18 |
| 6,842,238 B2* | 1/2005 | Corghi .................. 356/139.09 |
| 7,062,860 B2* | 6/2006 | Hara et al. .............. 33/203.12 |
| 2003/0131485 A1* | 7/2003 | Jahn et al. .................... 33/193 |
| 2003/0176949 A1* | 9/2003 | Steingraeber ............... 700/279 |
| 2004/0139620 A1* | 7/2004 | Stopa ...................... 33/203.18 |
| 2006/0101656 A1* | 5/2006 | Hobein et al. ........... 33/203.18 |

* cited by examiner

METHOD AND DEVICE FOR MEASURING WHEEL ALIGNMENT OF AUTOMOBILE

TECHNICAL FIELD

The present invention relates to a method and a device for measuring wheel alignment of an automobile carried in suspension through an automobile assembly line.

BACKGROUND ART

A known conventional technique for measuring wheel alignment of an automobile is described in Japanese Patent No. 2938984, for example. According to this technique, the toe angle and the camber angle of a wheel are measured via a wheel installation portion without fitting a wheel to the wheel installation portion in the automobile assembly line to enhance productivity.

According to the measurement method of this kind, in the automobile assembly line, a steering unit and a suspension unit are fitted onto an automobile body carried by a hanger, and then, the automobile body is separated from the hanger. At this time, a positioning pin provided below the automobile body supported by the hanger is fitted into a positioning hole of the automobile body, thereby positioning the automobile body. The automobile body is supported via a wheel installation portion, which is provided on the automobile body as a result of fitting of the suspension unit to the automobile body, in such a manner that the automobile body can be lifted and lowered. Then, lowering means is coupled to the front and the rear part of the automobile body via a linkage of the lowering means, such as a chain, and the automobile body is lowered to apply a predetermined load on the automobile body. Thus, a biasing force equivalent to the predetermine load is exerted on the suspension unit by the reaction force from the wheel installation portion, and the automobile body is settled in a state closest to the finished vehicle state in which wheels are fitted onto the axles. Then, while maintaining this state, the toe angle and the camber angle are measured via the wheel installation portion.

However, according to such a conventional method, the automobile has to be put in a state closest to the finished vehicle state, and the automobile separated from the hanger has to be positioned and pulled downward by the lowering means before measuring the toe angle and the camber angle. Thus, the method requires a relatively large number of measurement steps and is disadvantageously inefficient.

To overcome the disadvantage, it can be contemplated that the toe angle and the camber angle are measured on the automobile body supported by the hanger, instead of separating the automobile body from the hanger. In this case, the step of positioning the automobile body and the step of pulling downward the automobile body can be omitted, so that measurement can be conducted efficiently.

However, there is a play between the roller on the top of the hanger carrying the automobile and the carriage rail that guides the roller, and the center of gravity of the automobile body varies depending on the components mounted on the automobile body. Thus, an automobile body supported by a hanger may horizontally deviate from a predetermined orientation, or a hanger may be unable to support an automobile in a horizontal position, so that the automobile body may be inclined in a lateral direction. The toe angle and the camber angle measured on the automobile body supported by the hanger are disadvantageously inaccurate because of the inappropriate attitude of the automobile body at the time of measurement.

Furthermore, it is known that, if the suspension unit is a double-wishbone-type suspension, the toe angle is affected by the vertical distance between the mounting points of an upper arm and a lower arm or the displacement along the axle between the mounting points of the upper arm and the lower arm. Thus, it is desirable that the mounting states of the upper arm and the lower arm, which are components constituting the suspension unit, are grasped without putting the automobile in a state closest to the finished vehicle state as with the conventional method, and the result of measurement of wheel alignment is quickly reflected in the assembly step of the suspension unit.

The present invention eliminates such disadvantages, and an object of the present invention is to provide a method and a device for measuring wheel alignment of an automobile that can measure wheel alignment quickly and precisely without placing the same load on a wheel installation portion as that placed thereon in a finished vehicle state to improve the productivity and can quickly reflect the result of measurement of wheel alignment in an assembly process of a suspension unit.

DISCLOSURE OF THE INVENTION

In order to attain the object, the present invention provides a method of measuring wheel alignment of an automobile carried in suspension through an automobile assembly line, a wheel installation portion yet to be fitted with a wheel being capable of being lifted and lowered while keeping an automobile body in suspension, comprising: a wheel installation portion lifting step of lifting the wheel installation portion to a predetermined vertical position; a measuring step of measuring a position of the wheel installation portion and an inclination angle of the wheel installation portion in a predetermined direction during lift in the wheel installation portion lifting step; and an inclination angle calculating step of calculating the inclination angle of the wheel installation portion in the predetermined direction in a finished vehicle state from the measurement value obtained in the measurement step, characterized in that the measurement step further comprises: a deviation angle detecting step of detecting the deviation angle, in a predetermined direction, of the attitude of the automobile body supported in suspension with respect to a predetermined proper attitude of the automobile body at a measurement position; and a measurement value correcting step of correcting the measurement value of the inclination angle of the wheel installation portion in the predetermined direction based on the deviation angle detected in the deviation angle detecting step, and in the inclination angle calculating step, the inclination angle of the wheel installation portion in the predetermined direction in a finished vehicle state is calculated using the inclination angle of the wheel installation portion in the predetermined direction corrected in the measurement value correcting step as the measurement value.

According to the method of the present invention, when an automobile body is carried in suspension through an automobile assembly line, an inclination angle of a wheel installation portion in a predetermined direction (that is, a wheel alignment factor such as a toe angle and a camber angle) is measured with the automobile body kept in suspension, so that the process of placing the same load on the automobile body as that placed thereon in a finished vehicle state can be omitted, and the measurement of the inclination angle of the wheel installation portion in the predetermined direction can be efficiently carried out in a short time.

Specifically, first, an automobile body is supported in suspension while keeping a wheel installation portion capable of being lifted and lowered, the wheel installation portion is lifted to a predetermined vertical position in the wheel installation portion lifting step. For example, the vertical position to which the wheel installation portion is lifted is determined so that the automobile body supported by a hanger in the automobile assembly line is not lifted with the wheel installation portion and comes off the hanger. Thus, the inclination angle of the wheel installation portion in the predetermined direction can be measured with the automobile body being stably supported by the hanger without coming off the hanger. Then, in the measurement step, the position of the wheel installation portion being lifted and the inclination angle of the wheel installation portion in the predetermined direction are measured, and the inclination angle of the wheel installation portion in the predetermined direction in the finished vehicle state is calculated from the measurement values. In this way, the inclination angle of the wheel installation portion in the predetermined direction in a finished vehicle state can be determined while the automobile body is supported in suspension.

Since the automobile body is suspended by the hanger or the like, when the position of the wheel installation portion and the inclination angle of the wheel installation portion in the predetermined direction are measured, the actual attitude of the automobile body supported in suspension may deviate from a predetermined proper attitude at the measurement position. In this case, the measurement value of the inclination angle of the wheel installation portion in the predetermined direction is inaccurate because of the deviation angle. Thus, in the measuring step, the deviation angle of the automobile body in the predetermined direction is detected in the deviation angle detecting step, and then, the measured inclination angle of the wheel installation portion in the predetermined direction is corrected based on the deviation angle in the measurement value correcting step. In this way, the deviation angle can be eliminated from the measurement value of the inclination angle of the wheel installation portion in the predetermined direction, and an accurate measurement value of the inclination angle of the wheel installation portion in the predetermined direction can be obtained. Thus, according to the present invention, wheel alignment can be measured efficiently and precisely while keeping the automobile body suspended by the hanger or the like.

According to the method of the present invention, the inclination angle of the wheel installation portion in the predetermined direction may be the toe angle of the wheel installation portion or the camber angle of the wheel installation portion.

First, a case where the method of the present invention is applied to measurement of the toe angle will be described. In the case where the inclination angle of the wheel installation portion in the predetermined direction is the toe angle of the wheel installation portion, the deviation angle detected in the deviation angle detecting step is a thrust angle of the automobile body, which indicates a horizontal deviation of the longitudinal center line of the automobile body supported in suspension from a predetermined proper longitudinal center line of the automobile body at the measurement position. That is, if the automobile body is suspended by the hanger or the like, when the position and the toe angle of the wheel installation portion are measured, the longitudinal center line of the automobile body may not be aligned with the predetermined proper center line, and the thrust angle, which indicates the horizontal deviation of the center line, makes the measurement value of the toe angle inaccurate. Thus, in the measuring step, the thrust angle, which is the horizontal deviation angle of the center line, is detected in the deviation angle detecting step, and then, the measured toe angle is corrected based on the thrust angle in the measurement value correcting step. In this way, the thrust angle can be eliminated form the measurement value of the toe angle, and an accurate measurement value of the toe angle can be obtained. Thus, according to the present invention, the toe angle can be measured efficiently and precisely while keeping the automobile body suspended by the hanger or the like.

Furthermore, according to the method of the present invention, it is preferred that the detection of the thrust angle in the deviation angle detecting step is performed simultaneously with the measurement of the position and the toe angle of the wheel installation portion being lifted. Thus, since the thrust angle can be detected at the time of measurement of the toe angle to correct the measured toe angle, a more accurate measurement value of the toe angle can be obtained.

Furthermore, the method of the present invention is characterized in that the inclination angle calculating step further comprises: a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected in the measurement value correcting step, and the plurality of measurement coordinate points being specified by positions of the wheel installation portion measured at predetermined intervals until the wheel installation portion is lifted to the predetermined vertical position and toe angles of the wheel installation portion measured at the positions and corrected in the measurement value correcting step; a second arithmetic step of calculating an estimated value of the toe angle of the wheel installation portion at the position thereof in the finished vehicle state based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by the first reference coordinate point and a predetermined proper toe angle associated with the position, and the plurality of preset coordinate points being specified by the positions of the wheel installation portion designated by the measurement coordinate points and predetermined proper toe angles associated with the positions; and a third arithmetic step of determining the adjustment amount of the toe angle required to achieve a proper toe angle of the wheel installation portion at the position thereof in the finished vehicle state based on the value obtained in the second arithmetic step.

That is, in the first arithmetic step, first, the position of the wheel installation portion at the time when the lift of the wheel installation portion is started in the wheel installation portion lifting step and the toe angle of the wheel installation portion at the position are measured, and the measurement value of the toe angle is corrected in the measurement value correcting step. Then, the coordinate point specified by the measured position and the corrected toe angle is designated as the first reference coordinate point. Then, positions of the wheel installation portion and toe angles of the wheel installation portion at the positions are measured at predetermined intervals until the wheel installation portion is lifted to the predetermined vertical position, and the measured toe angles are corrected in the measurement value correcting step. Then, a plurality of coordinate points specified by the measured positions and the corrected toe angles at the positions are designated as measurement coordinate points. Then, the slopes of the lines that connect the first reference coordinate point with the plurality of measurement coordinate points are calculated.

In the second arithmetic step, first, the differences between the slopes of a plurality of lines that connect a previously calculated second reference coordinate point with a plurality of preset coordinate points and the slopes of the lines that connect the first reference coordinate point with the measurement coordinate points are calculated. The second reference coordinate point is a coordinate point specified by the position of the wheel installation portion designated by the first reference coordinate point (that is, the position at which the lift of the wheel installation portion in the wheel installation portion lifting step is started) and a predetermined proper toe angle associated with the position.

The preset coordinate points are coordinate points specified by the positions of the wheel installation portion designated by the measurement coordinate points (that is, the positions of the wheel installation portion measured at predetermined intervals until the wheel installation portion is lifted to the predetermined vertical position) and predetermined proper toe angles associated with the positions.

The inventor has conducted various kinds of tests about the variation of the toe angle and found that the differences between the slopes of the lines that connect the second reference coordinate point with the preset coordinate points and the slopes of the lines that connect the first reference coordinate point with the measurement coordinate points vary with the position of the wheel installation portion in a certain manner.

Thus, in the second arithmetic step, an estimated value of the toe angle of the wheel installation portion at the position thereof in the finished vehicle state is calculated based on the differences between the slopes of the lines that connect the second reference coordinate point with the preset coordinate points and the slopes of the lines that connect the first reference coordinate point with the measurement coordinate points.

Then, in the third arithmetic step, the adjustment amount of the toe angle required to achieve a proper toe angle of the wheel installation portion at the position thereof in the finished vehicle state is determined based on the value obtained in the second arithmetic step. Thus, the toe angle of the wheel installation portion at the position thereof in the finished vehicle state can be accurately calculated without actually bringing the wheel installation portion to the position thereof in the finished vehicle state, and the adjustment amount of the toe angle required to achieve the proper toe angle of the wheel installation portion at the position thereof in the finished vehicle state can be readily determined.

Now, a case where the method of the present invention is applied to measurement of the camber angle will be described. In the case where the inclination angle of the wheel installation portion in the predetermined direction is a camber angle of the wheel installation portion, the deviation angle detected in the deviation angle detecting step is an attitude angle of the automobile body, which indicates a deviation, from the horizontal plane, of the lateral axis of the automobile body kept in suspension before measurement of the position and the camber angle of the wheel installation portion. If the automobile body is suspended by the hanger or the like, when the camber angle of the wheel installation portion is measured, the automobile body may be inclined in the lateral direction, instead of being supported in a horizontal position, and the inclination in the lateral direction makes the measurement value of the camber angle inaccurate. Thus, in the measuring step, the attitude angle, which indicates the deviation of the lateral axis of the automobile body from the horizontal plane, is detected in the deviation angle detecting step, and then, the measured camber angle is corrected based on the attitude angle in the measurement value correcting step. In this way, the attitude angle can be eliminated from the measurement value of the camber angle, and an accurate measurement value of the camber angle can be obtained. Thus, according to the present invention, the camber angle can be measured efficiently and precisely while keeping the automobile body suspended by the hanger or the like.

Furthermore, the method of the present invention is characterized in that the inclination angle calculating step further comprises: a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the camber angle of the wheel installation portion measured at the position and corrected in the measurement value correcting step, and the plurality of measurement coordinate points being specified by positions of the wheel installation portion measured at predetermined intervals until the wheel installation portion is lifted to the predetermined vertical position and camber angles of the wheel installation portion measured at the positions and corrected in the measurement value correcting step; a second arithmetic step of calculating an estimated value of the camber angle of the wheel installation portion at the position thereof in the finished vehicle state based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by the first reference coordinate point and a predetermined proper camber angle associated with the position, and the plurality of preset coordinate points being specified by the positions of the wheel installation portion designated by the measurement coordinate points and predetermined proper camber angles associated with the positions; and a third arithmetic step of determining the adjustment amount of the camber angle required to achieve a proper camber angle of the wheel installation portion at the position thereof in the finished vehicle state based on the value obtained in the second arithmetic step.

That is, in the first arithmetic step, first, the position of the wheel installation portion at the time when the lift of the wheel installation portion is started in the wheel installation portion lifting step and the camber angle of the wheel installation portion at the position are measured, and the measurement value of the camber angle is corrected in the measurement value correcting step. Then, the coordinate point specified by the measured position and the corrected camber angle is designated as the first reference coordinate point. Then, positions of the wheel installation portion and camber angles of the wheel installation portion at the positions are measured at predetermined intervals until the wheel installation portion is lifted to the predetermined vertical position, and the measured camber angles are corrected in the measurement value correcting step. Then, a plurality of coordinate points specified by the measured positions and the corrected camber angles at the positions are designated as measurement coordinate points. Then, the slopes of the lines that connect the first reference coordinate point with the plurality of measurement coordinate points are calculated.

In the second arithmetic step, first, the differences between the slopes of a plurality of lines that connect a previously calculated second reference coordinate point with a plurality of preset coordinate points and the slopes of the lines that connect the first reference coordinate point with the measurement coordinate points are calculated. The second reference coordinate point is a coordinate point specified by the position of the wheel installation portion designated by the first reference coordinate point (that is, the position at which the lift of the wheel installation portion in the wheel installation portion lifting step is started) and a predetermined proper camber angle associated with the position.

The preset coordinate points are coordinate points specified by the positions of the wheel installation portion designated by the measurement coordinate points (that is, the positions of the wheel installation portion measured at predetermined intervals until the wheel installation portion is lifted to the predetermined vertical position) and predetermined proper camber angles associated with the positions.

The inventor has conducted various kinds of tests not only about the variation of the toe angle but also about the variation of the camber angle and found that the differences between the slopes of the lines that connect the second reference coordinate point with the preset coordinate points and the slopes of the lines that connect the first reference coordinate point with the measurement coordinate points vary with the position of the wheel installation portion in a certain manner.

Thus, in the second arithmetic step, an estimated value of the camber angle of the wheel installation portion at the position thereof in the finished vehicle state is calculated based on the differences between the slopes of the lines that connect the second reference coordinate point with the preset coordinate points and the slopes of the lines that connect the first reference coordinate point with the measurement coordinate points.

Then, in the third arithmetic step, the adjustment amount of the camber angle required to achieve a proper camber angle of the wheel installation portion at the position thereof in the finished vehicle state is determined from the value obtained in the second arithmetic step. Thus, the camber angle of the wheel installation portion at the position thereof in the finished vehicle state can be accurately calculated without actually bringing the wheel installation portion to the position thereof in the finished vehicle state, and the adjustment amount of the camber angle required to achieve the proper camber angle of the wheel installation portion at the position thereof in the finished vehicle state can be readily determined.

In the case where the inclination angle of the wheel installation portion in the predetermined direction is the toe angle of the wheel installation portion, the method of the present invention is characterized in that the method further comprises: a data extracting step of extracting predetermined data concerning the mounting state of a component constituting a suspension unit when calculating the toe angle in the inclination angle calculating step; and a determination step of determining whether the mounting state of the component constituting the suspension unit is appropriate or not based on the data extracted in the data extracting step.

According to the method of the present invention, the data extracting step is provided, and predetermined data concerning the mounting state of the component constituting the suspension unit is extracted when calculating the toe angle in the inclination angle calculating step. Then, in the determination step, it is determined whether the mounting state of the component constituting the suspension unit is appropriate or not based on the data extracted in the data extracting step.

Thus, with the automobile body kept supported in suspension, the toe angle of the wheel installation portion in the finished vehicle state can be checked, and at the same time, the mounting state of the component constituting the suspension unit can be checked. In addition, the result of determination in the determination step can be reflected in analysis of the mounting state of the component constituting the suspension unit.

Specific implementations of the inclination angle calculating step and the data extracting step in the method of the present invention are as follows. That is, the inclination angle calculating step comprises: a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected in the measurement value correcting step, and the plurality of measurement coordinate points being specified by positions of the wheel installation portion measured at predetermined intervals until the wheel installation portion is lifted to the predetermined vertical position and toe angles of the wheel installation portion measured at the positions and corrected in the measurement value correcting step; a second arithmetic step of calculating slope differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by the first reference coordinate point and a predetermined proper toe angle associated with the position, and the plurality of preset coordinate points being specified by the positions of the wheel installation portion designated by the measurement coordinate points and predetermined proper toe angles associated with the positions; and a third arithmetic step of determining the slope of a line that connects at least two of a plurality of coordinate points specified by the slope differences calculated in the second arithmetic step and the positions of the wheel installation portion associated with the respective slope differences and calculating the toe angle of the wheel installation portion at the position thereof in the finished vehicle state based on the determined slope.

In the data extracting step, the slope calculated in the third arithmetic step is extracted as first data concerning the mounting state of the component constituting the suspension unit, a slope difference related to the position of the wheel installation portion in the finished vehicle state is determined based on the first data and the slope differences calculated in the second arithmetic step, and the slope difference is extracted as second data concerning the mounting state of the component constituting the suspension unit.

In the first arithmetic step in the inclination angle calculating step, first, the position of the wheel installation portion at the time when the lift of the wheel installation portion is started in the wheel installation portion lifting step and the toe angle of the wheel installation portion at the position are measured, and the coordinate point specified by the measured position and the toe angle corrected in the measurement value correcting step is designated as the first reference coordinate point. Then, positions of the wheel installation portion and toe angles of the wheel installation portion at the positions are measured at predetermined intervals until the wheel installation portion is lifted to the predetermined vertical position, and a plurality of coordinate points specified by the measured positions and the toe angles at the positions corrected in the measurement value correcting step are designated as measurement coordinate points. Then, the slopes of the lines that connect the first reference coordinate point with the plurality of measurement coordinate points are calculated.

In the second arithmetic step in the inclination angle calculating step, first, the differences between the slopes of a plurality of lines that connect a previously calculated second reference coordinate point with a plurality of preset coordinate points and the slopes of the lines that connect the first reference coordinate point with the measurement coordinate points are calculated. The second reference coordinate point is a coordinate point specified by the position of the wheel installation portion designated by the first reference coordinate point (that is, the position at which the lift of the wheel installation portion in the wheel installation portion lifting step is started) and a predetermined proper toe angle associated with the position.

The preset coordinate points are coordinate points specified by the positions of the wheel installation portion designated by the measurement coordinate points (that is, the positions of the wheel installation portion measured at predetermined intervals until the wheel installation portion is lifted to the predetermined vertical position) and predetermined proper toe angles associated with the positions.

The inventor has conducted various kinds of tests about the variation of the toe angle and found that the differences between the slopes of the lines that connect the second reference coordinate point with the preset coordinate points and the slopes of the lines that connect the first reference coordinate point with the measurement coordinate points vary with the position of the wheel installation portion in a certain manner. Thus, in the second arithmetic step, the differences between the slopes of the lines that connect the second reference coordinate point with the preset coordinate points and the slopes of the lines that connect the first reference coordinate point with the measurement coordinate points (slope differences) are calculated.

Then, in the third arithmetic step in the inclination angle calculating step, first, the slope of a line that connects at least two of a plurality of coordinate points specified by the slope differences calculated in the second arithmetic step and the positions of the wheel installation portion associated with the respective slope differences is calculated. Then, based on the calculated slope, the toe angle of the wheel installation portion at the position thereof in the finished vehicle state is calculated. Thus, the toe angle of the wheel installation portion at the position thereof in the finished vehicle state can be accurately calculated without actually bringing the wheel installation portion to the position thereof in the finished vehicle state.

Furthermore, the inventor has conducted various kinds of tests concerning the variation of the toe angle and the mounting state of the component constituting the suspension unit and found that the slope of a line that connects at least two of a plurality of coordinate points specified by the slope differences calculated in the second arithmetic step and the positions of the wheel installation portion associated with the respective slope differences and the slope difference related to the position of the wheel installation portion in the finished vehicle state vary with the mounting state of the component constituting the suspension unit.

Thus, in the data extracting step, the slope calculated in the third arithmetic step is extracted as first data, and the slope difference related to the position of the wheel installation portion in the finished vehicle state, which can be determined based on the first data and the slope differences calculated in the second arithmetic step, is extracted as second data. Thus, in the determination step, it can be readily determined based on the first data and the second data whether the mounting state of the component constituting the suspension unit is appropriate or not.

More specifically, in the case where the component constituting the suspension unit is a double-wishbone-type suspension that has an upper arm and a lower arm, in the determination step, it can be determined based on the first data whether the vertical distance between the mounting points of the upper arm and the lower arm is appropriate or not, and it can be determined based on the second data whether the distance along an axle between the mounting points of the upper arm and the lower arm is appropriate or not. Thus, for example, in a process of mounting the suspension unit on the automobile body, the vertical distance between the mounting points of the upper arm and the lower arm can be appropriately adjusted based on the first data, and the distance along an axle between the mounting points of the upper arm and the lower arm can be appropriately adjusted based on the second data. Thus, the precision of mounting of the upper arm and the lower arm can be readily improved.

In addition, the present invention provides a device that measures wheel alignment of an automobile carried in suspension through an automobile assembly line, characterized in that the device comprises: automobile body supporting means that supports an automobile body in suspension while allowing a wheel installation portion yet to be fitted with a wheel to be lifted and lowered; wheel installation portion lifting means that is disposed below the automobile body supported by the automobile body supporting means and lifts the wheel installation portion to a predetermined vertical position; first measuring means that is provided on the wheel installation portion lifting means and measures a vertical position of the wheel installation portion; second measuring means that is provided on the wheel installation portion lifting means and measures an inclination angle of the wheel installation portion in a predetermined direction; deviation angle detecting means that detects a deviation angle, in a predetermined direction, of the attitude of the automobile body supported in suspension from a predetermined proper attitude of the automobile body; measurement control means that allows the measurement of the vertical position by the first measuring means, the measurement of the inclination angle of the wheel installation portion in the predetermined direction by the second measuring means and the detection of the deviation angle of the automobile body by the deviation angle detecting means to be performed at predetermined intervals until the wheel installation portion is lifted from the position where the lift of the wheel installation portion by the wheel installation portion lifting means is started to a predetermined vertical position; and inclination angle calculating means that calculates the inclination angle of the wheel installation portion in the predetermined direction at the position thereof in the finished vehicle state based on the measurement value obtained by the first measuring means, the measurement value obtained by the second measuring means and the angle detected by the deviation angle detecting means.

When the inclination angle of the wheel installation portion in the predetermined direction is measured with the device of the present invention, first, the automobile body supporting means supports the automobile body. At this time, it is essential only that the automobile body is supported so that the automobile body can be lifted and lowered. Specifically, a hanger that carries the automobile body through the automobile assembly line can be used as the automobile body supporting means, for example.

Then, the wheel installation portion lifting means lifts the wheel installation portion of the automobile body supported by the automobile body supporting means. Then, when the wheel installation portion is being lifted by the wheel installation portion lifting means, under the control of the measurement control means, the first measuring means measures a vertical position of the wheel installation portion, the second measuring means measures a inclination angle of the wheel installation portion in the predetermined direction, and the deviation angle detecting means detects a deviation angle.

Then, the inclination angle calculating means calculates the inclination angle of the wheel installation portion in the predetermined direction at the position thereof in the finished vehicle state based on the measurement value obtained by the first measuring means, the measurement value obtained by the second measuring means and the angle detected by the deviation angle detecting means.

In this way, since the inclination angle calculating means corrects the inclination angle of the wheel installation portion in the predetermined direction measured by the second measuring means based on the deviation angle detected by the deviation angle detecting means, the inclination angle of the wheel installation portion in the predetermined direction in a finished vehicle state can be accurately calculated from the accurate measurement value of the inclination angle of the wheel installation portion in the predetermined direction.

In the device of the present invention, the inclination angle of the wheel installation portion in the predetermined direction may be the toe angle of the wheel installation portion or the camber angle of the wheel installation portion.

First, a case where the device of the present invention is applied to measurement of the toe angle will be described. In the case where the inclination angle of the wheel installation portion in the predetermined direction is a toe angle of the wheel installation portion, the deviation angle detected by the deviation angle detecting means is a thrust angle of the automobile body, which indicates a horizontal deviation of the longitudinal center line of the automobile body supported in suspension from a predetermined proper longitudinal center line of the automobile body at the measurement position. That is, when the device of the present invention measures the toe angle, the second measuring means measures the toe angle of the wheel installation portion, and the deviation angle detecting means detects the thrust angle. Then, the inclination angle calculating means calculates the toe angle of the wheel installation portion at the position thereof in the finished vehicle state based on the measurement value obtained by the first measuring means, the measurement value obtained by the second measuring means and the thrust angle detected by the deviation angle detecting means.

In this way, since the inclination angle calculating means corrects the toe angle measured by the second measuring means based on the thrust angle detected by the deviation angle detecting means, the toe angle of the wheel installation portion at the position thereof in the finished vehicle state can be accurately calculated from the accurate measurement value of the toe angle.

Specifically, the inclination angle calculating means comprises: a first arithmetic means that calculates the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected based on the angle detected by the deviation angle detecting means, and the plurality of measurement coordinate points being specified by positions of the wheel installation portion measured at predetermined intervals until the wheel installation portion is lifted to the predetermined vertical position and toe angles of the wheel installation portion measured at the positions and corrected based on the angle detected by the deviation angle detecting means; a second arithmetic means that calculates an estimated value of the toe angle of the wheel installation portion at the position thereof in the finished vehicle state based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by the first reference coordinate point and a predetermined proper toe angle associated with the position, and the plurality of preset coordinate points being specified by the positions of the wheel installation portion designated by the measurement coordinate points and predetermined proper toe angles associated with the positions; and a third arithmetic means that determines the adjustment amount of the toe angle required to achieve a proper toe angle of the wheel installation portion at the position thereof in the finished vehicle state based on the value obtained by the second arithmetic means.

Since the inclination angle calculating means not only calculates the slopes of the lines that connect the first reference coordinate point with the measurement coordinate points but also calculates the estimated value of the toe angle of the wheel installation portion at the position thereof in the finished vehicle state based on the differences between the slopes of the lines that connect the second reference coordinate point with the preset coordinate points and the slopes of the lines that connect the first reference coordinate point with the measurement coordinate points, the toe angle of the wheel installation portion at the position thereof in the finished vehicle state can be calculated without actually bringing the wheel installation portion to the position thereof in the finished vehicle state. In addition, since the adjustment amount of the toe angle required to achieve the proper toe angle of the wheel installation portion at the position thereof in the finished vehicle state can be determined based on the estimated value of the toe angle, it is assured that the toe angle of the wheel installation portion in the finished vehicle state can be determined quickly and accurately with a simple device without placing a load on the automobile body as with a conventional technique.

Now, a case where the device of the present invention is applied to measurement of the camber angle will be described. In the case where the inclination angle of the wheel installation portion in the predetermined direction is a camber angle of the wheel installation portion, the deviation angle detected by the deviation angle detecting means is an attitude angle of the automobile body, which indicates a deviation, from the horizontal plane, of the lateral axis of the automobile body kept in suspension. That is, when the device of the present invention measures the camber angle, the second measuring means measures the camber angle of the wheel installation portion, and the deviation detecting means detects the attitude angle. Thus, the inclination angle calculating means calculates the camber angle of the wheel installation portion at the position thereof in the finished vehicle state based on the measurement value obtained by the first measuring means, the measurement value obtained by the second measuring means and the attitude angle detected by the deviation angle detecting means.

In this way, since the camber angle measured by the second measuring means is corrected based on the attitude angle detected by the deviation angle detecting means, the inclination angle calculating means can accurately calculate the camber angle of the wheel installation portion at the position thereof in the finished vehicle state based on the accurate measurement value of the camber angle.

BEST MODE FOR CARRYING OUT THE INVENTION

An embodiment of the present invention will be described with reference to the drawings.

Figure 1:
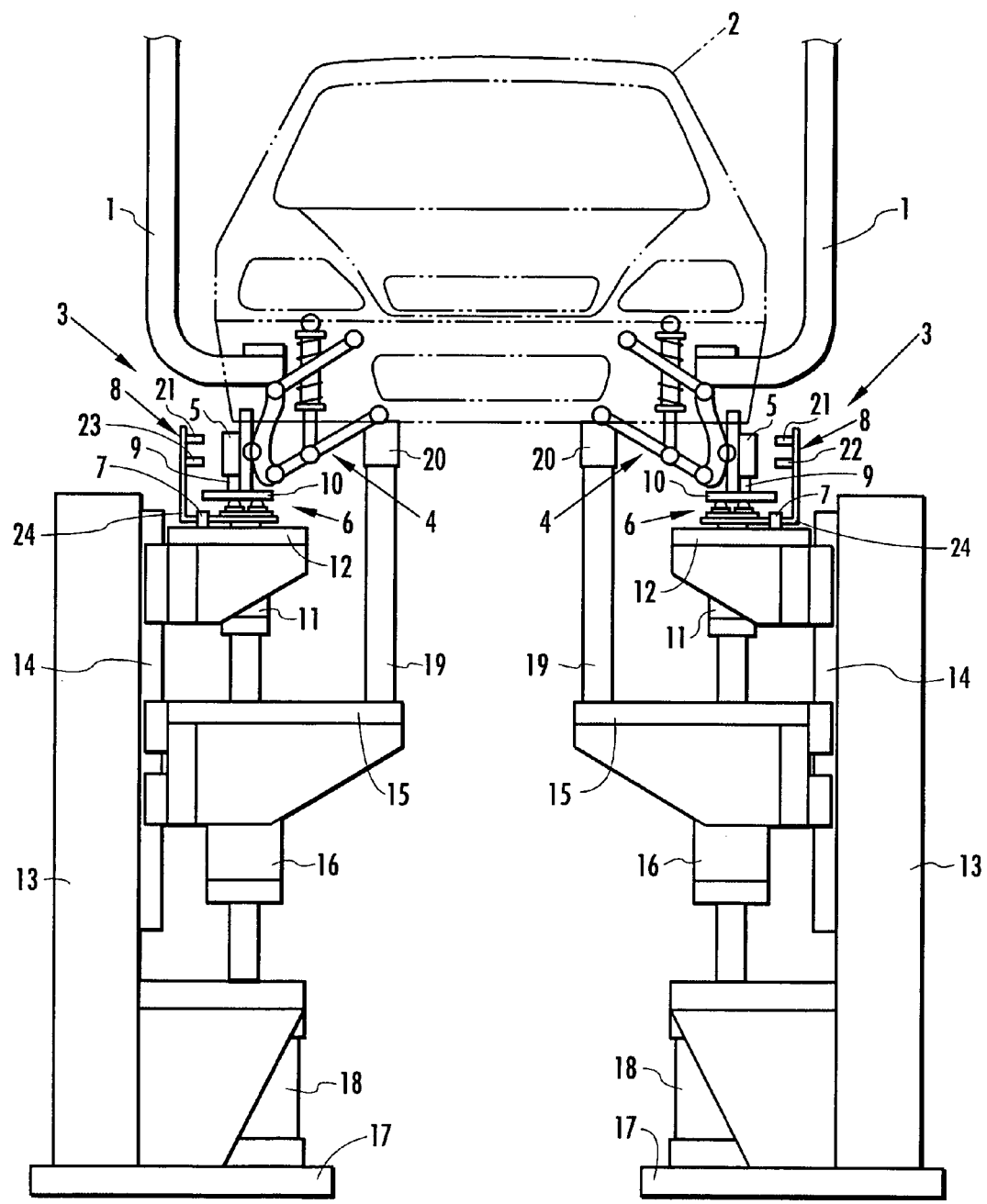
FIG. 1 is a schematic diagram showing an arrangement of a wheel alignment measurement device according to an embodiment of the present invention.

In FIG. 1, reference numeral 1 denotes a hanger that supports an automobile body 2, and the hanger carries the automobile body 2 along an assembly line (not shown). A wheel alignment measuring device 3 according to this embodiment is provided below the carrying path along which the hanger 1 carries the automobile body 2. When the automobile body 2 is carried to right above the wheel alignment measuring device 3, the automobile body 2 has been provided with a steering unit (not shown) and a suspension unit 4 in the assembly line, and the position of the steering unit has been adjusted to a neutral position. Besides, a wheel installation portion 5, which is fitted to the automobile body 2 via the suspension unit 4, is yet to be fitted with a wheel, hangs down from the automobile body 2 suspended by the hanger 1, and can be lifted and lowered.

As shown in FIG. 1, the wheel alignment measuring device 3 comprises wheel installation portion lifting means 6 that lifts the wheel installation portion 5, first measuring means 7 that measures the vertical position of the wheel installation portion 5, and second measuring means 8 that measures the toe angle and the camber angle of the wheel installation portion 5, which are inclination angles thereof toward predetermined directions. The first measuring means 7 and the second measuring means 8 are connected to measurement control means (not shown) that controls the measurement at plural points described later. Furthermore, the measurement control means is connected to calculation means (inclination angle calculating means) (not shown), and the calculation means calculates the toe angle and the camber angle from plural measurement values received from the measurement control means. Although not shown, the calculation means has data extraction means and determination means, described later, as well as the inclination angle calculating means.

Figure 2:
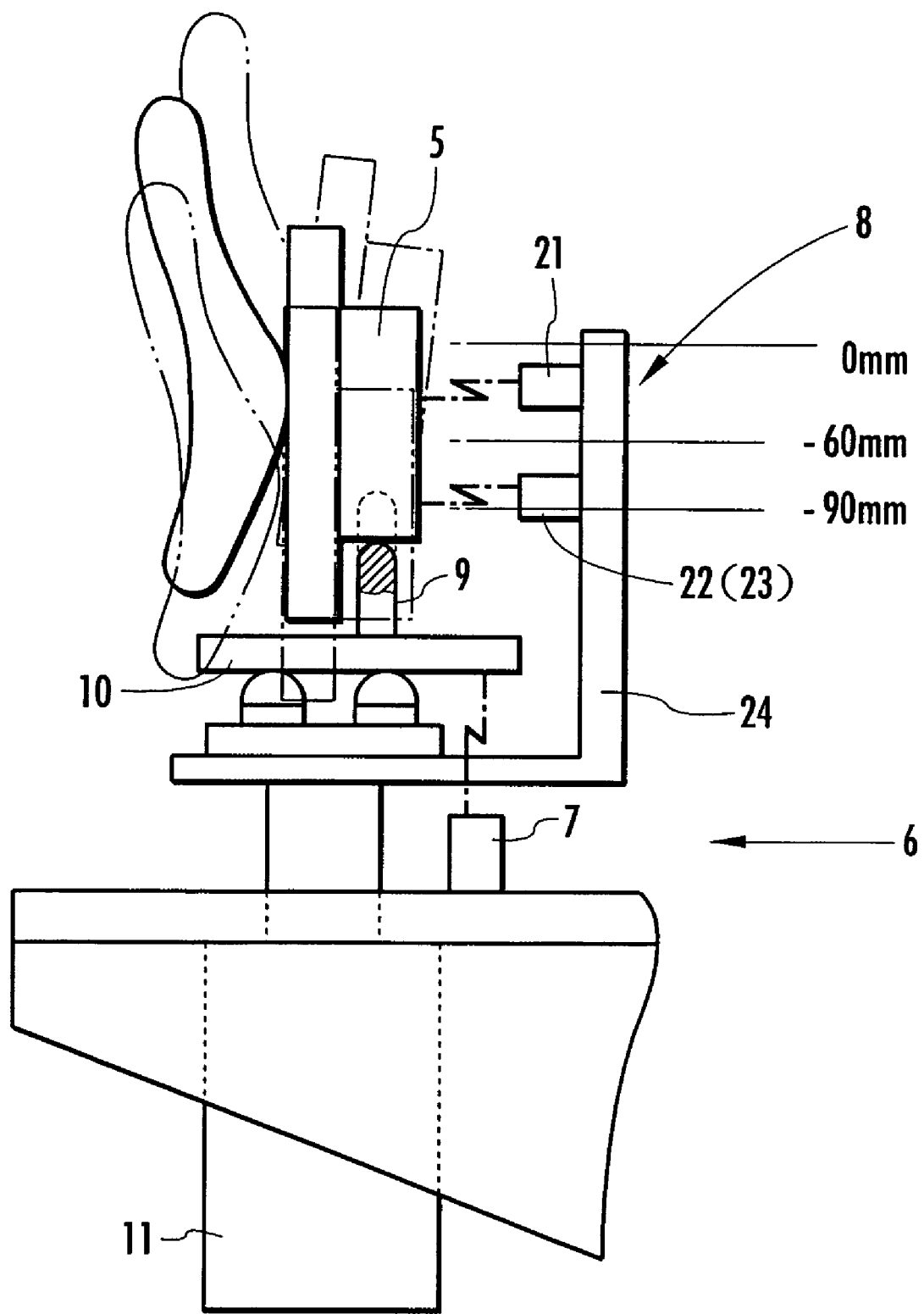
FIG. 2 is a diagram for illustrating an operation of wheel installation portion lifting means.

Four wheel installation portion lifting means 6 are provided, each of which is associated with one wheel installation portion 5 of the automobile body 2. As shown in FIGS. 1 and 2, one wheel installation portion lifting means 6 comprises an abutment member 9 that abuts against the wheel installation portion 5 from below, an lifting plate 10 that can be lifted and lowered and integrally supports the abutment member 9, and a first cylinder 11 that lifts the wheel installation portion 5 abutted against the abutment member 9 via the lifting plate 10. The first cylinder 11 is provided on a first table 12, which can be lifted and lowered along a guide rail 14 on a vertical strut 13. A second table 15 that can be lifted and lowered along the guide rail 14 is provided below the first table 12, and a second cylinder 16 that lifts and lowers the first table 12 is provided on the second table 15. The second table 15 is lifted and lowered by a third cylinder 18, which is provided on a bracket 17 formed on a lower part of the strut 13.

In addition, a bar-shaped attitude angle detecting means 19 (deviation angle detecting means) is provided on the second table 15. The attitude angle detecting means 19 has, at the tip end thereof, a sensor 20 that senses that it comes into contact with a base end of the suspension unit 4 at the bottom of the automobile body 2 as the second table 15 is lifted. If the sensor 20 sences that it comes into contact with the base end of the suspension unit 4 at the bottom of the automobile body 2, the third cylinder 18 is stopped operating, and the second table 15 is fixed at the position. Four attitude angle detecting means 19 are provided, each of which is associated with one wheel installation portion 5 of the automobile body 2. When lift of the second table 15 is stopped based on the detection by the sensor 20, the attitude angle of the automobile body on the hanger 1 in the lateral direction (the inclination angle of the automobile body with respect to the horizontal plane, or the deviation angle) is determined from a difference between the positions of a right-hand pair of attitude angle detecting means 19 and a left-hand pair of attitude angle detecting means 19 (specifically, a difference in elongated length between third cylinders 18, for example).

Figure 3:
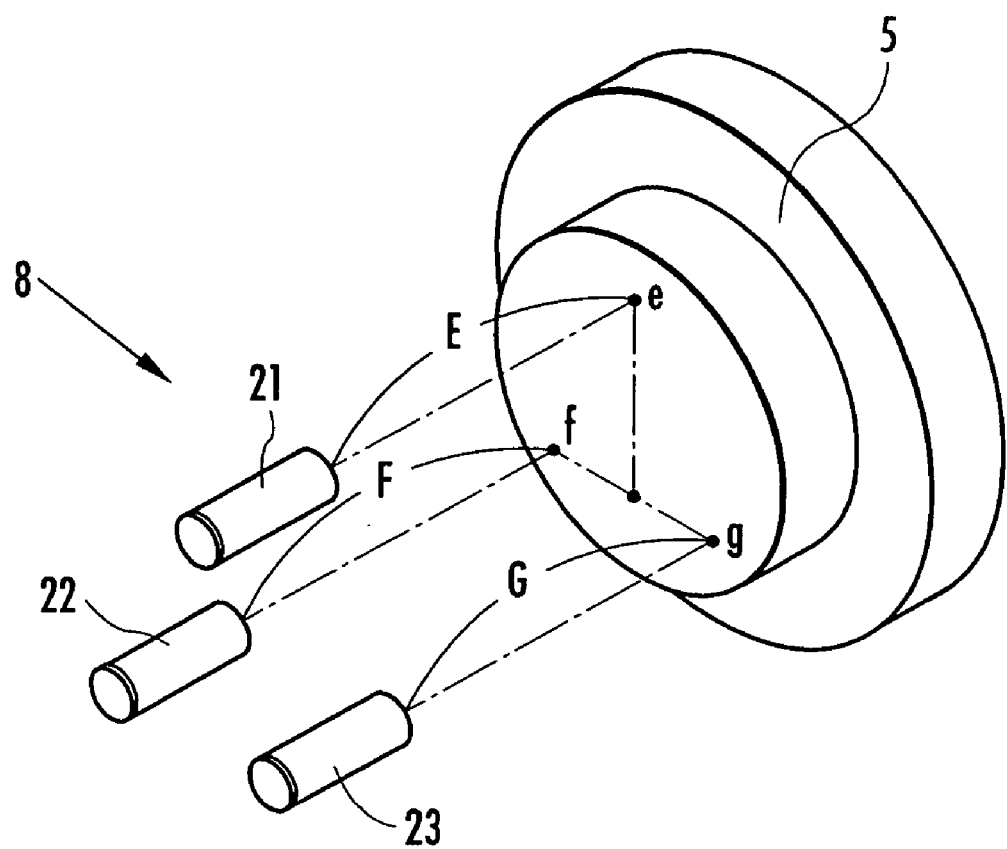
FIG. 3 is a diagram for illustrating second measurement means.

As shown in FIGS. 1 and 2, the first measuring means 7 is a laser sensor disposed on the first table 12 and determines the axle center position of the wheel installation portion 5 by measuring the distance of lift of the lifting plate 10. Besides, as shown in FIG. 3, the second measuring means 8 is composed of three laser sensors (a first sensor 21, a second sensor 22 and a third sensor 23), is integrally supported on a supporting member 24 and is lifted and lowered by the first cylinder 11. The first sensor 21, the second sensor 22 and the third sensor 23 are located in front of three points e, f and g on the wheel installation portion 5, respectively. The first sensor 21 measures a distance E to the point e on the wheel installation portion 5, the second sensor 22 measures a distance F to the point f on the wheel installation portion 5, and the third sensor 23 measures a distance G to the point g on the wheel installation portion 5. The horizontal displacement between the points f and g is determined from the difference between the distance F measured by the second sensor 22 and the distance G measured by the third sensor 23, and the toe angle is determined from the horizontal displacement. Besides, the vertical displacement between the point e and the midpoint between the points f and g is determined from the difference between the distances measured by the first sensor 15, the second sensor 16 and the third sensor 17, and the camber angle is determined from the vertical displacement.

Figure 4:
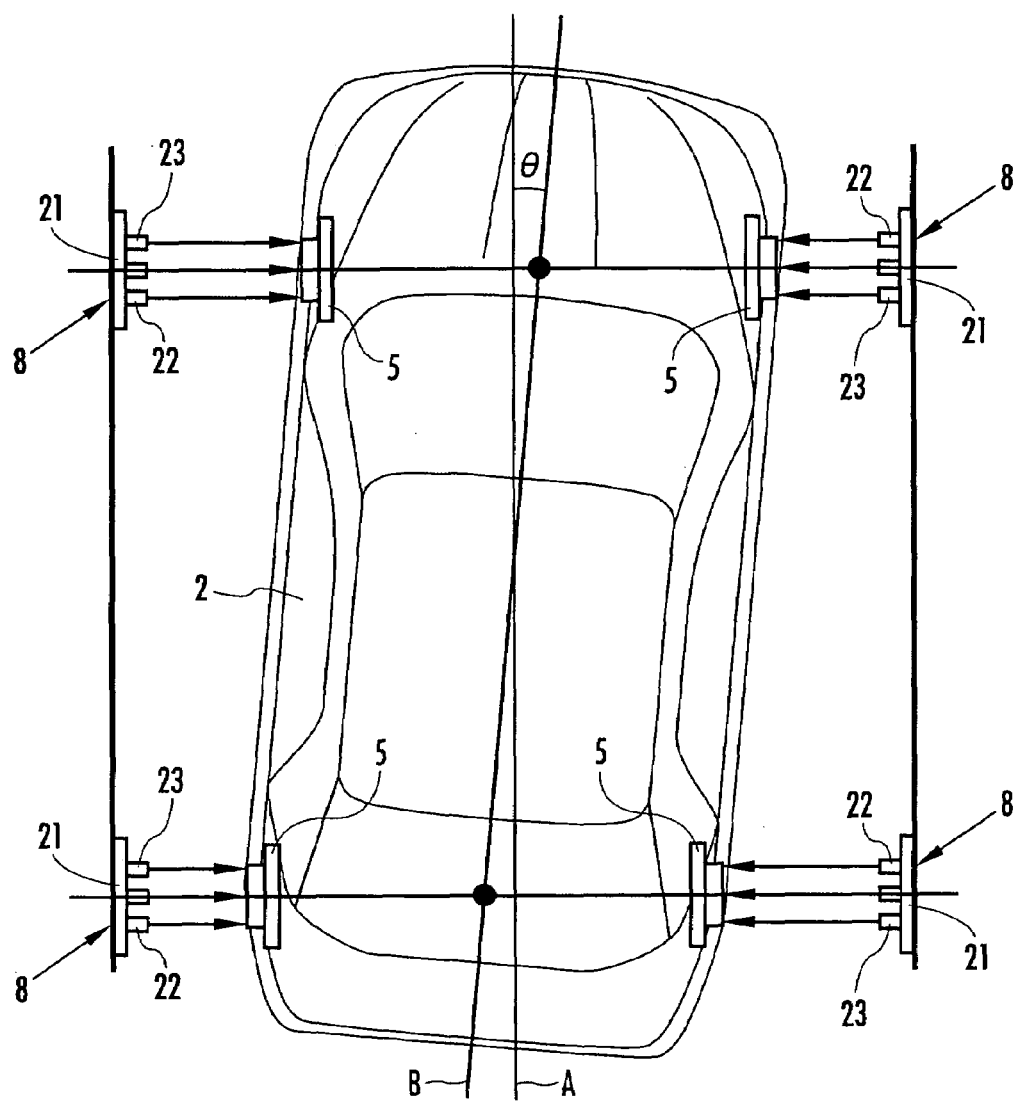
FIG. 4 is a plan view for illustrating an attitude of an automobile body during measurement.

The first sensor 21, the second sensor 22 and the third sensor 23 of the second measuring means 8 provide the measurement results also to a thrust angle detecting means (deviation angle detecting means)(not shown). Thus, based on the distance E between the first sensor 21 and the point e on the wheel installation portion 5, the distance F between the second sensor 22 and the point f on the wheel installation portion 5 and the distance G between the third sensor 23 and the point g on the wheel installation portion 5 shown in FIG. 3, the thrust angle detecting means determines the distance between each second measuring means 8 and the associated wheel installation portion 5 according to a formula (E+F+G)/3 and, then, calculates the thrust angle θ of the automobile body 2 based on the distances between the four wheel installation portions 5 on the automobile body 2 and their respective associated second measuring means 8, as shown in FIG. 4. In this way, the thrust angle detecting means detects, as the thrust angle θ, the angle of horizontal deviation of a longitudinal center line B of the automobile body 2 supported in suspension from a predetermined proper longitudinal center line A of the automobile body 2. Detection of the thrust angle θ by the thrust angle detecting means is performed simultaneously with measurement by the first measuring means 7 and the second measuring means 8 under the control of the measurement control means described above.

Figure 5:
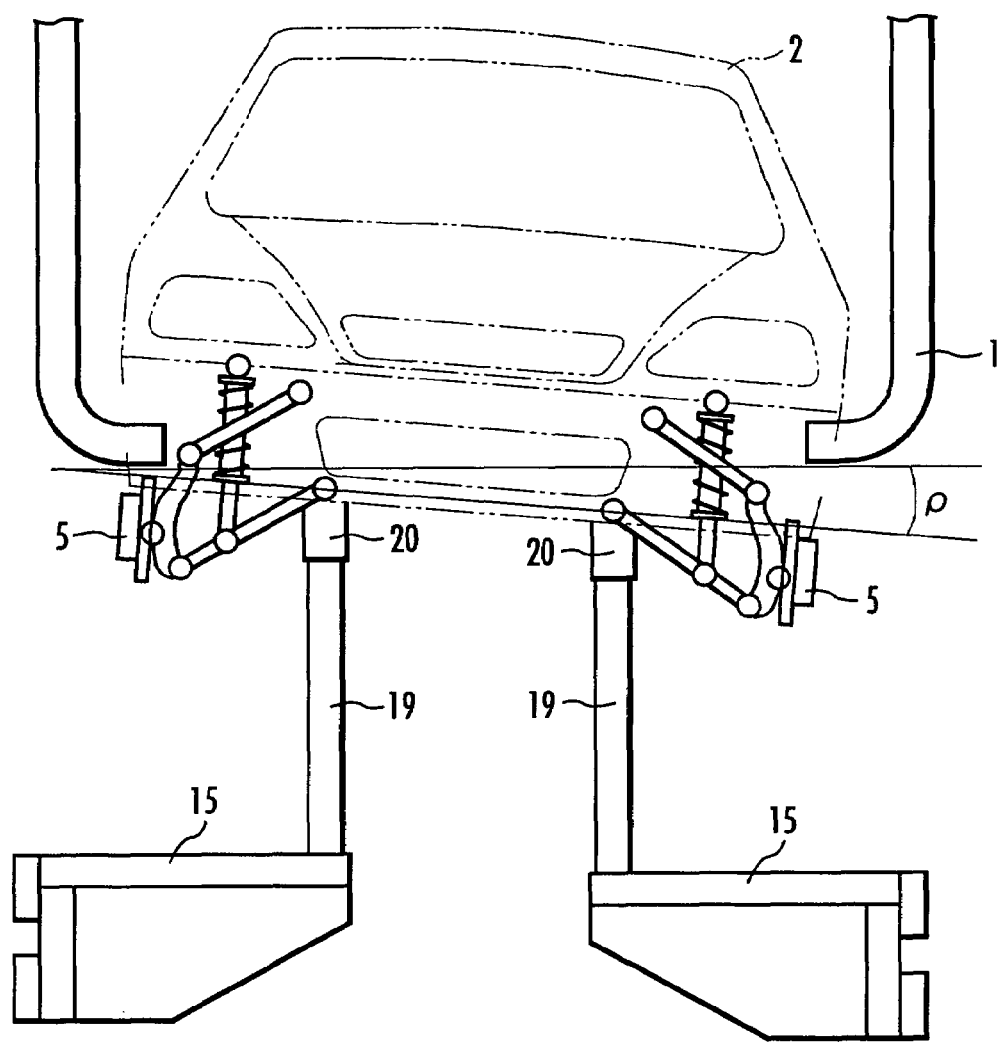
FIG. 5 is a diagram showing an attitude of the automobile body during measurement.

In the following, a method of measuring wheel alignment according to this embodiment will be described. As shown in FIG. 1, when the automobile body 2 supported by the hanger 1 is carried to right above the wheel alignment measuring device 3, the third cylinder 18 lifts the second table 15. Then, when the sensors 20 of all the attitude angle detecting means 19 come into contact with the automobile body 2, the lift of the second table 15 is stopped. At this point in time, the attitude angle p of the automobile body 2 is determined from the differences between the contact points of the attitude angle detecting means 19, as shown in FIG. 5. Then, once the attitude angle detecting means 19 are in contact with the automobile body 2, the second cylinder 16 brings the wheel installation portion lifting means 6 close to the wheel installation portion 5.

Then, as shown in FIG. 2, the first cylinder 11 lifts the lifting plate 10, thereby bringing the abutment member 9 into contact with the wheel installation portion 5. At this point in time, the first measuring means 7 measures the axle center position of the wheel installation portion 5 at the start of lifting. At this point in time, the wheel installation portion 5 hangs down from the automobile body 2. In the case of the automobile to be measured according to this embodiment, the wheel installation portion 5 is located at a position 90 mm or slightly more lower than the position (0 mm) of the wheel installation portion 5 in the finished vehicle state.

Then, the first cylinder 11 further lifts the lifting plate 10, thereby lifting the wheel installation portion 5 until the axle center position of the wheel installation portion 5 reaches a position 60 mm lower than the position of the wheel installation portion 5 in the finished vehicle state. According to this embodiment, a measurement starting position is set at the position 90 mm lower than the position of the wheel installation portion 5 in the finished vehicle state, and a toe-angle/camber-angle adjustment position is set at the position 60 mm lower than the wheel installation portion 5 in the finished vehicle state.

When each wheel installation portion 5 is being lifted by the wheel installation portion lifting means 6, under the control of the measurement control means, a plurality of positions of the wheel installation portion 5 are measured, the toe angle and the camber angle thereof are measured at the positions, and the thrust angle θ of the automobile body 2 is measured. According to this embodiment, under the control of the measurement control means, the first measurement means 7 measures the position of the wheel installation portion 5 and detects that it reaches positions 90 mm, 80 mm, 70 mm and 60 mm lower than the position of the wheel installation portion 5 in the finished vehicle state, and the second measurement means 8 measures the toe angle and the camber angle of the wheel installation portion 5 at the positions, and the thrust angle detecting means determines the thrust angle θ of the automobile body 2.

According to this embodiment, the automobile body 2 supported by the hanger 1 does not come off and float over the hanger 1 even when the wheel installation portion 5 is lifted to the position 60 mm lower than the position of the wheel installation portion 5 in the finished vehicle state (or lifted by 30 mm from the position 90 mm lower than the wheel installation portion 5 in the finished vehicle state). In this way, since the highest position of the lifted wheel installation portion 5 is set at a position that assures that the automobile body 2 is supported by the hanger 1 without floating over the hanger 1, the toe angle and the camber angle can be measured in a stable state.

Then, the wheel installation portion 5 is lifted by the wheel installation portion lifting means 6. During this lifting process, the positions of the wheel installation portion 5, the toe angles and camber angles thereof at the positions, and the thrust angle of the automobile body 2 are measured.

Then, the calculation means corrects the toe angles based on the thrust angle and corrects the camber angles based on the attitude angle previously determined, thereby calculating the toe angle and the camber angle of the wheel installation portion 5 at the position thereof in the finished vehicle state.

Then, based on the toe angle and the camber angle of the wheel installation portion 5 at the position thereof in the finished vehicle state, the calculation means calculates the amounts of adjustment of the toe angle and the camber angle performed at the adjustment position (at the position 60 mm lower than the position of the wheel installation portion 5 in the finished vehicle state). And based on the adjustment amounts, the toe angle and the camber angle are adjusted at the adjustment position.

Now, calculation of the toe angle of the wheel installation portion 5 at the position thereof in the finished vehicle state and calculation of the adjustment amount thereof by the calculation means will be described. First, in STEP 1 shown in FIG. 6, the wheel installation portion 5 is lifted by the wheel installation portion lifting means 6, the axle center position of the wheel installation portion 5 (a=−90 mm), the toe angle b' on the hanger 1 and the thrust angle θ are measured at the measurement starting position, and subsequently, the toe angle b' on the hanger 1 and the thrust angle θ are measured at regular intervals (every 10 mm) until the axle center position of the wheel installation portion 5 reaches the adjustment position (a=−60 mm). Furthermore, in STEP 2 shown in FIG. 6, a corrected toe angle b is determined by reflecting each thrust angle θ in the corresponding toe angle b' measured in STEP 1. For example, referring to in FIG. 4, when the center line B of front half the automobile body 2 deviates to the right from the proper center line A, the corrected toe angles b of the wheel installation portions 5 for the front-right wheel and the rear-right wheel on the automobile body 2 are determined from the formula (1). In this case, the corrected toe angles b of the wheel installation portions 5 for the front-left wheel and the rear-left wheel on the automobile body 2 are determined from the formula (2), since the center line B of the automobile body 2 deviates to the right from the proper center line A.

$$b=b'+\theta \tag{1}$$

$$b=b'-\theta \tag{2}$$

Figure 7:
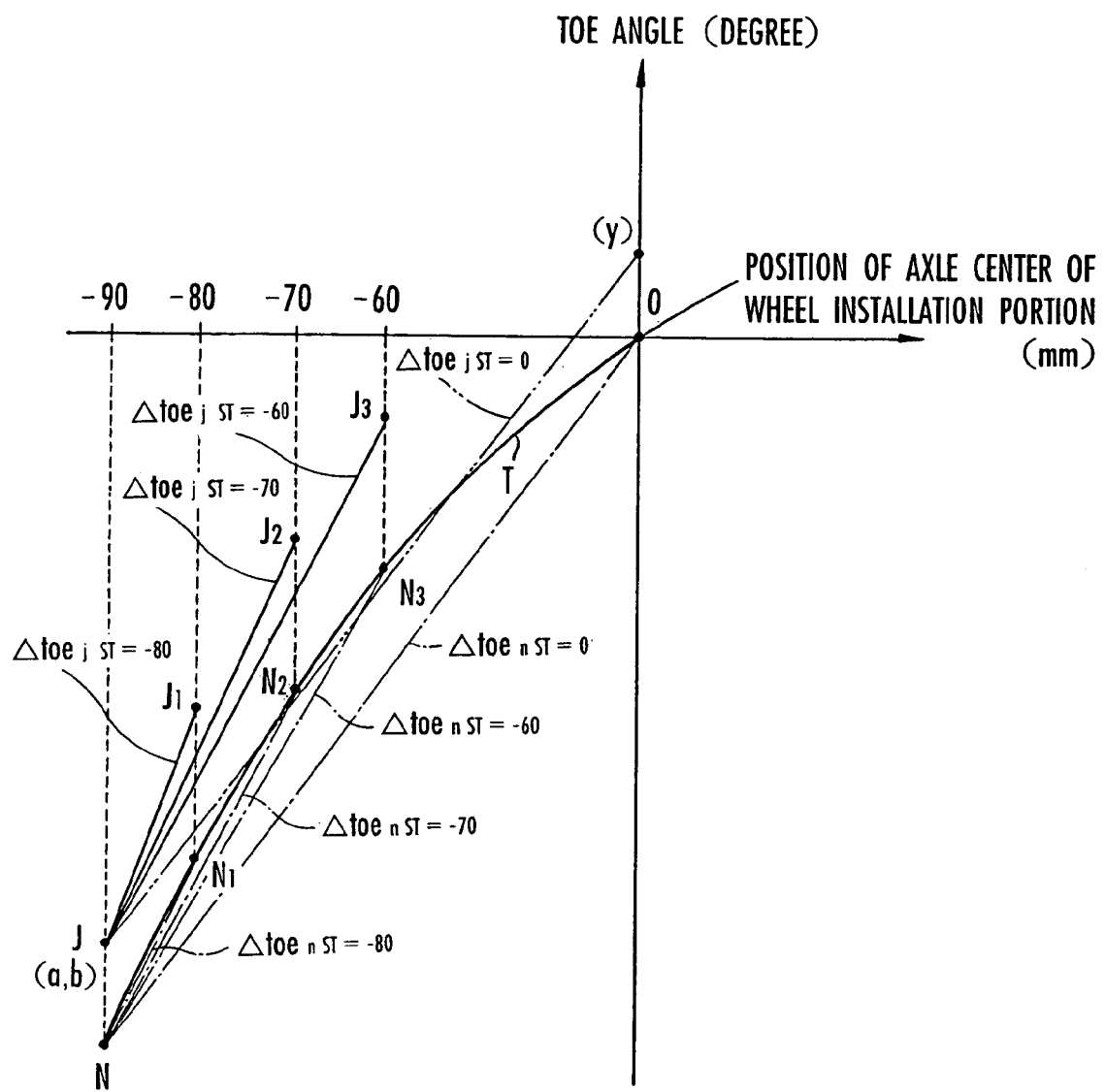
FIG. 7 is a graph showing a relationship between the position of a wheel installation portion and the toe angle thereof.

As shown in FIG. 7, it is supposed that a first reference coordinate point J is represented by coordinates (a, b) that indicate the toe angle b measured when the axle center position a of the wheel installation portion 5 is located at the position 90 mm lower than the position thereof in the finished vehicle state and corrected. Furthermore, it is supposed that a first measurement coordinate point $J_1$ is represented by coordinates (a, b) that indicate the toe angle b measured when the axle center position a of the wheel installation portion 5 is located at the position 80 mm lower than the position thereof in the finished vehicle state and corrected, a second measurement coordinate point $J_2$ is represented by coordinates (a, b) that indicate the toe angle b measured when the axle center position a of the wheel installation portion 5 is located at the position 70 mm lower than the position thereof in the finished vehicle state and corrected, and a third measurement coordinate point $J_3$ is represented by coordinates (a, b) that indicate the toe angle b measured when the axle center position a of the wheel installation portion 5 is located at the position 60 mm lower than the position thereof in the finished vehicle state and corrected.

Figure 6:
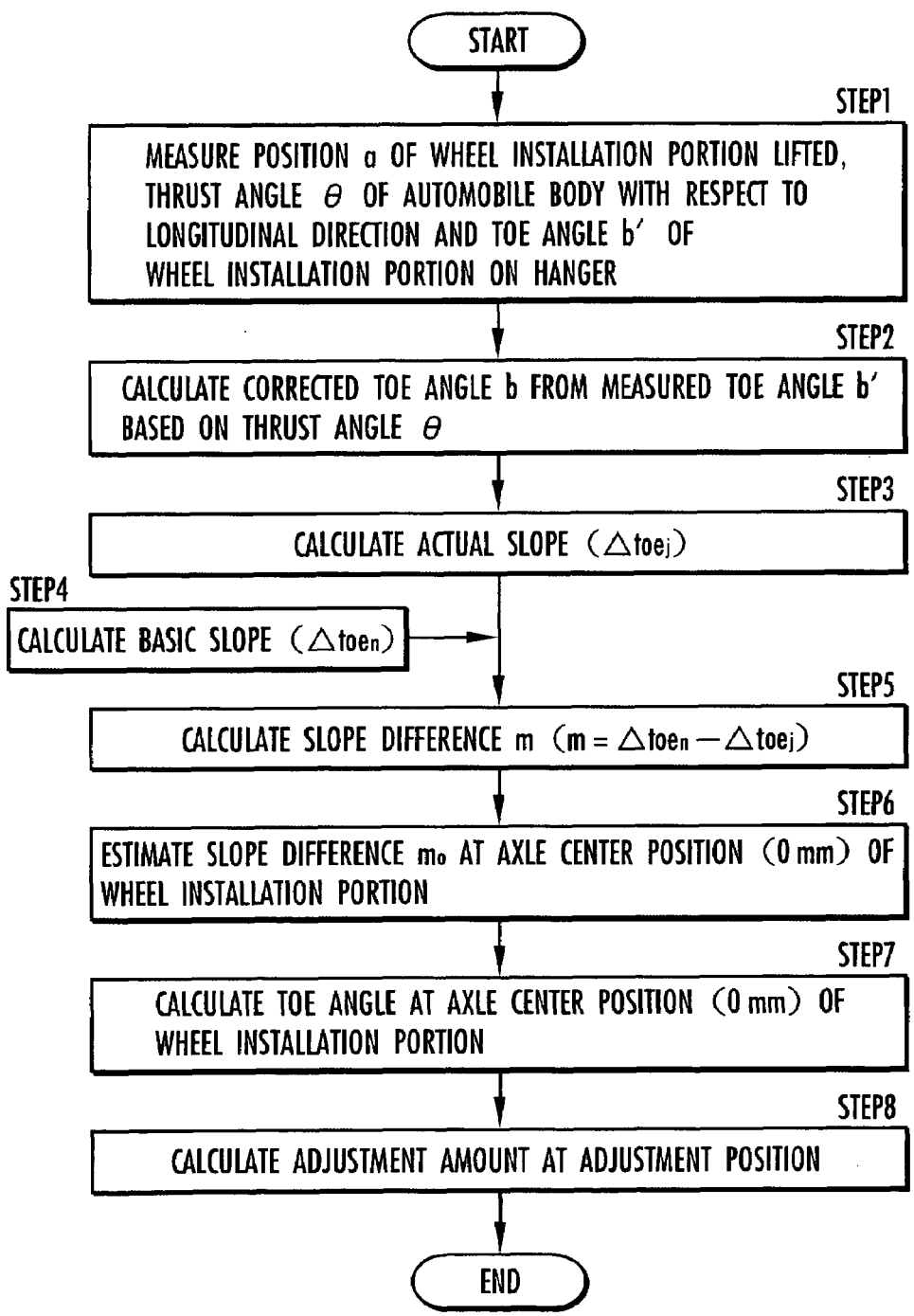
FIG. 6 is a flowchart showing a method of measuring a toe angle.

Then, as shown in FIG. 7, the slope of the line from the first reference coordinate point J to the first measurement coordinate point $J_1$ $\Delta toe_{jst=-80}$, the slope of the line from the first reference coordinate point J to the second measurement coordinate point $J_2$ $\Delta toe_{jst=-70}$, and the slope of the line from the first reference coordinate point J to the third measurement coordinate point $J_3$ $\Delta toe_{jst=-60}$ are calculated (see STEP 3 in FIG. 6). In the following, the slopes thus calculated will be referred to as actual slope ($\Delta toe_j$).

On the other hand, for various kinds of automobiles, the amount of variation of the proper toe angle with the lift of the wheel installation portion 5 by the wheel installation portion lifting means 6 is recorded in the calculation means in the form of a basic characteristic curve T as shown in FIG. 7. In the basic characteristic curve T, as shown in FIG. 7, it is supposed that a second reference coordinate point N is represented by coordinates that indicate the proper toe angle at the time when the axle center position of the wheel installation portion 5 is located at the position 90 mm lower than the position thereof in the finished vehicle state (or at the measurement starting position). Similarly, it is supposed that a first preset coordinate point $N_1$ is represented by coordinates that indicate the proper toe angle at the time when the axle center position of the wheel installation portion 5 is located at the position 80 mm lower than the position thereof in the finished vehicle state, a second preset coordinate point $N_2$ is represented by coordinates that indicate the proper toe angle at the time when the axle center position of the wheel installation portion 5 is located at the position 70 mm lower than the position thereof in the finished vehicle state, and a third reference coordinate point $N_3$ is represented by coordinates that indicate the proper toe angle at the time when the axle center position of the wheel installation portion 5 is located at the position 60 mm lower than the position thereof in the finished vehicle state. As shown in FIG. 7, the slope of the line from the second reference coordinate point N to the first preset coordinate point $N_1$ $\Delta toe_{nst=-80}$, the slope of the line from the second reference coordinate point N to the second preset coordinate point $N_2$ $\Delta toe_{nst=-70}$, and the slope of the line from the second reference coordinate point N to the third preset coordinate point $N_3$ $\Delta toe_{nst=-60}$ are previously calculated (see STEP 4 in FIG. 6) and recorded. In the following, the slopes previously recorded will be referred to as basic slope ($\Delta toe_n$).

Then, in STEP 5 in FIG. 6, the difference (m) between each actual slope ($\Delta toe_n$) and the corresponding basic slope ($\Delta toe_j$) is calculated.

$$m_{-80}=\Delta toe_{nst=-80}-\Delta toe_{jst=-80} \tag{3}$$

$$m_{-70}=\Delta toe_{nst=-70}-\Delta toe_{jst=-70} \tag{4}$$

$$m_{-60}=\Delta toe_{nst=-60}-\Delta toe_{jst=-60} \tag{5}$$

Figure 8:
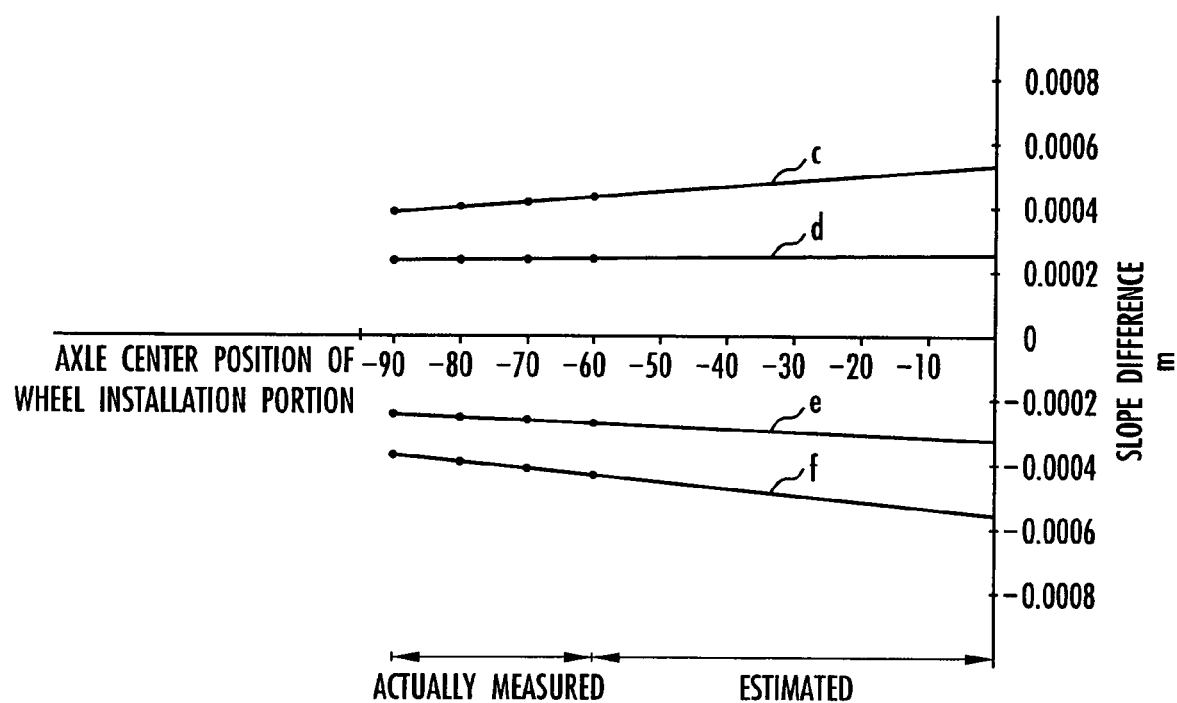
FIG. 8 is a graph showing a relationship between the position of the wheel installation portion and the slope difference.

In this way, the slope differences $m_{-80}$, $m_{-70}$ and $m_{-60}$ are determined. From various kinds of tests, the inventor has found that the difference (m) between the actual slope ($\Delta toe_j$) and the corresponding basic slope ($\Delta toe_n$) varies with the axle center position of the wheel installation portion 5 in a certain manner. That is, as shown in FIG. 8, provided that the horizontal axis indicates the axle center position of the wheel installation portion 5, and the vertical axis indicates the difference (m) between the actual slope ($\Delta toe_j$) and the basic slope ($\Delta toe_n$), the difference (m) between the actual slope ($\Delta toe_j$) and the basic slope ($\Delta toe_n$) at each axle center position of the wheel installation portion 5 can be represented by a linear function (y=ax+b). The line c in FIG. 8 indicates the slope difference (m) for one of the four wheel installation portions 5. For one automobile body, in addition to the line c, the lines d, e and f for the other three wheel installation portions 5, which are successively measured, are determined. Thus, the slope difference $m_0$ at the axle center position (0 mm) of the wheel installation portion 5 in the finished vehicle state can be estimated from the calculated slope differences $m_{-80}$, $m_{-70}$ and $m_{-60}$ (see STEP 6 in FIG. 6).

Then, based on the value of the slope difference $m_0$, the toe angle y at the axle center position (0 mm) of the wheel installation portion 5 in the finished vehicle state is calculated from the formula (6) that represents the slope $\Delta toe_{jst=0}$ (a shift p from the coordinate of the proper toe angle is shown in FIG. 7) (see STEP 7 in FIG. 6).

$$y=\alpha(x-a)+b \quad (6)$$

In the formula (6), reference character a denotes the slope $\Delta toe_{jst=0}$ at the axle center position x of the wheel installation portion 5 in the finished vehicle state ($\alpha=\Delta toe_{nst=0}+m_0$). The toe angle y at the axle center position (x=0) of the wheel installation portion 5 in the finished vehicle state in the formula (6) can be represented by the formula (7).

$$y=-\alpha a+b \quad (7)$$

The toe angle y calculated here is one at the axle center position of the wheel installation portion 5 in the finished vehicle state. However, the position for adjusting the toe angle is 60 mm lower than the axle center position of the wheel installation portion 5 in the finished vehicle state. Thus, a correction amount y' associated with the adjustment position is added to the calculated toe angle y as shown in the formula (8), thereby determining the adjustment amount q (see STEP 8 in FIG. 6).

$$q=y+y'=y+ky \quad (8)$$

The correction amount y' can be determined by multiplying the toe angle y by a correction coefficient k, which is previously calculated for the adjustment position of each model of automobile. Based on the adjustment amount q thus determined, the toe angle is adjusted at the adjustment position.

According to this embodiment, as for the wheel installation portion 5 corresponding to the line c, the data extraction means of the calculation means extracts the slope of the line c as first data Y and extracts the estimated value of the difference (m) between the actual slope ($\Delta toe_j$) and the basic slope ($\Delta toe_n$) at the axle center position (0 mm) of the wheel installation portion 5 in the finished vehicle state as second data X. That is, the first data Y and the second data X are extracted during the process of estimating the slope difference $m_0$ in STEP 6 in FIG. 6.

Figure 9:
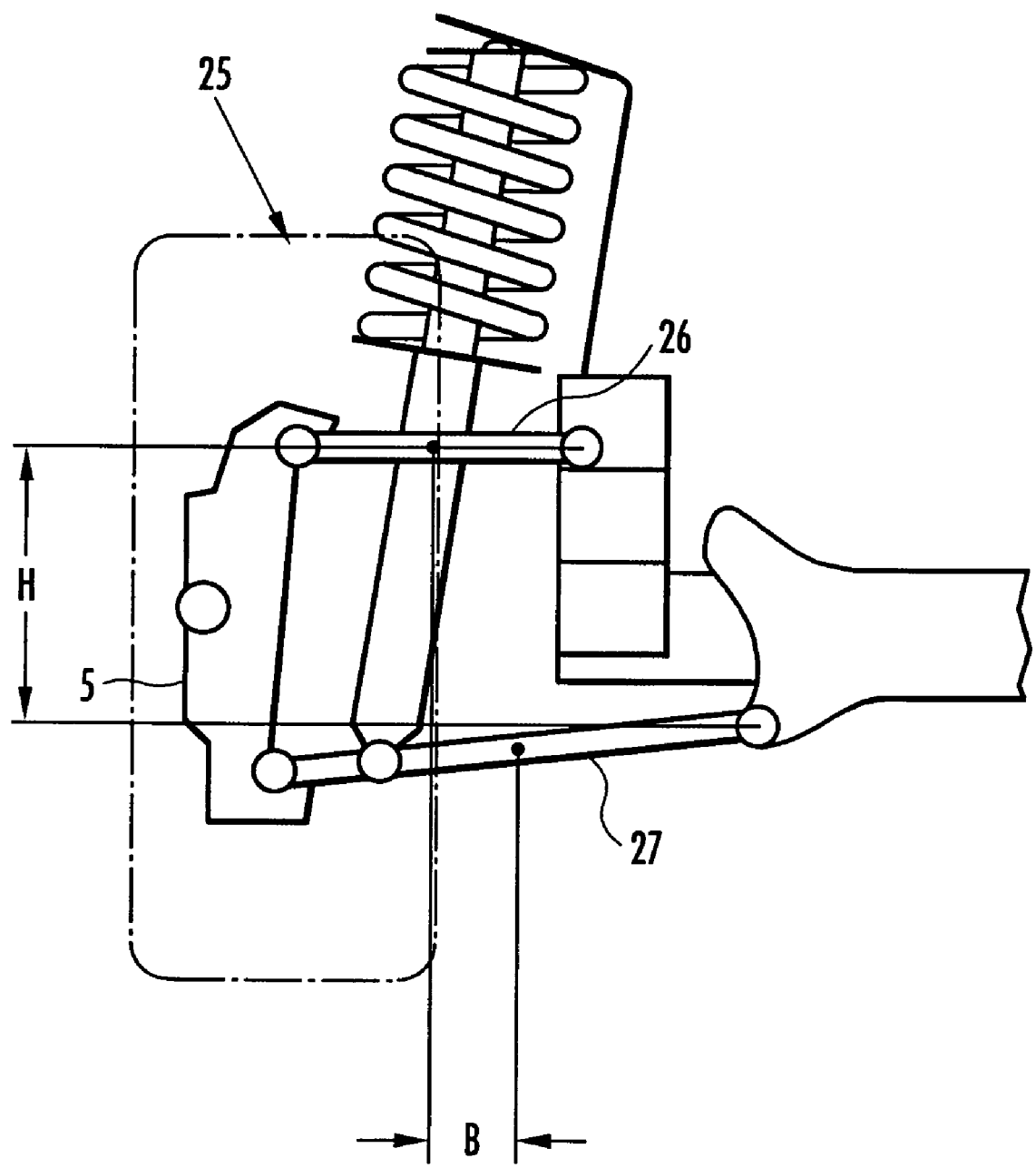
FIG. 9 is a schematic diagram showing an arrangement of a suspension unit of the automobile.

From various kinds of tests, the inventor has found that, if the wheel installation portion 5 is fitted to the automobile body 2 via a double-wishbone-type suspension 25, which constitutes the suspension unit 4, as schematically shown in FIG. 9, the first data Y varies depending on the vertical distance H between the mounting points of an upper arm 26 and a lower arm 27, and the second data X varies depending on the distance B along the axle between the mounting points of the upper arm 26 and the lower arm 27.

Thus, the determination means of the calculation means determines whether the vertical distance H between the mounting points of the upper arm 26 and the lower arm 27 coupled to the wheel installation portion 5 corresponding to the line c and the distance B along the axle between the mounting points of the upper arm 26 and the lower arm 27 are appropriate or not based on whether the first data Y and the second data X fall within a preset predetermined range or not.

Figure 10:
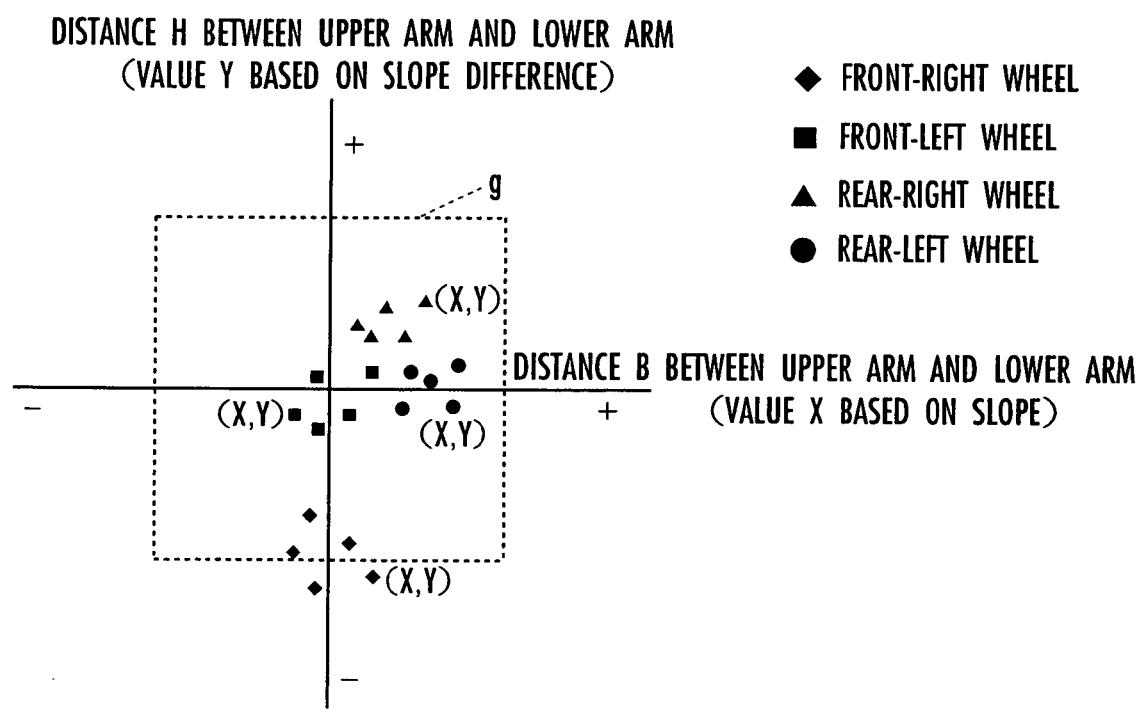
FIG. 10 is a graph showing a relationship concerning mounting points of an upper arm and a lower arm.

Specifically, as shown in FIG. 10, coordinates (X, Y) indicating the first data Y and the second data X are plotted in a graph whose vertical axis indicates the vertical distance H between the mounting points of the upper arm 26 and the lower arm 27 and whose horizontal axis indicates the distance B along the axle between the mounting points of the upper arm 26 and the lower arm 27. In FIG. 10, a distribution of coordinates (X, Y) concerning the wheel installation portions 5 associated with the four wheels of one model of automobile is shown for plural (five, in FIG. 10) automobile bodies.

Thus, as shown in FIG. 10, when a coordinate point (X, Y) lies outside a predetermined range g, it is possible to determine which part of the wheels should be adjusted in vertical distance H between the mounting points of the upper arm 26 and the lower arm 27 and in distance B along the axle between the mounting points of the upper arm 26 and the lower arm 27 in order to make the coordinates (X, Y) fall within the predetermined range g. Furthermore, from the distribution of the coordinates (X, Y) concerning plural bodies of one model of automobile, the tendency of mounting of the upper arm 26 and the lower arm 27 of the model can be readily grasped. Thus, the tendency can be reflected in design modification or the like of the suspension unit to make the suspension unit more precise.

As described above, according to this embodiment, the toe angle of the wheel installation portion 5 can be measured and adjusted extremely quickly at the adjustment position (at the position 60 mm lower than that of the wheel installation portion in the finished vehicle state, according to this embodiment) without placing on the automobile body the same load as that placed thereon in a finished vehicle state. Furthermore, since the adjustment amount of the toe angle can be determined simply by lifting the wheel installation portion 5 to the adjustment position without making the automobile body 2 come off the hanger 1, the toe angle can be measured and adjusted efficiently, and the productivity can be improved. In addition, even if the longitudinal center line B of the automobile body 2 suspended by the hanger 1 deviates horizontally from the proper center line A by a thrust angle θ, the toe angle can be calculated with accuracy. In addition, since it is possible to check whether the suspension unit is mounted appropriately or not by determining whether the upper arm 26 and the lower arm 27 are mounted appropriately or not while measuring the toe angle, the productivity can be improved.

Now, calculation of the camber angle of the wheel installation portion 5 at the position in the finished vehicle state and calculation of the adjustment amount thereof by the calculation means will be described. First, when the second table 15 is lifted, and when the sensors 20 of all the attitude angle detecting means 19 come into contact with the automobile body 2, the attitude angle ρ is detected in STEP 1 in FIG. 11. Then, in STEP 2 in FIG. 11, the wheel installation portion 5 is lifted by the wheel installation portion lifting means 6, the axle center position of the wheel installation portion 5 (a=−90 mm) and the camber angle b' on the hanger 1 are measured at the measurement starting position, and subsequently, the camber angle b' on the hanger 1 is measured at regular intervals (every 10 mm) until the axle center position of the wheel installation portion 5 reaches the adjustment position (a=−60 mm). Furthermore, in STEP 3 in FIG. 11, a corrected camber angle b is determined by reflecting each attitude angle ρ in the corresponding camber angle b' measured in STEP 2. For example, referring to in FIG. 5, when the automobile body 2 is not in a horizontal position and is inclined to the right by the attitude angle ρ, the corrected camber angles b of the wheel installation portions 5 for the front-right wheel and the rear-right wheel on the automobile body 2 are determined from the formula (9) (see STEP 2 in FIG. 11). In this case, the corrected camber angles b of the wheel installation portions 5 for the front-left wheel and the rear-left wheel on the automobile body 2 are determined from the formula (10), since the automobile body 2 is inclined to the right.

$$b = b' - \rho \tag{9}$$

$$b = b' + \rho \tag{10}$$

Figure 12:
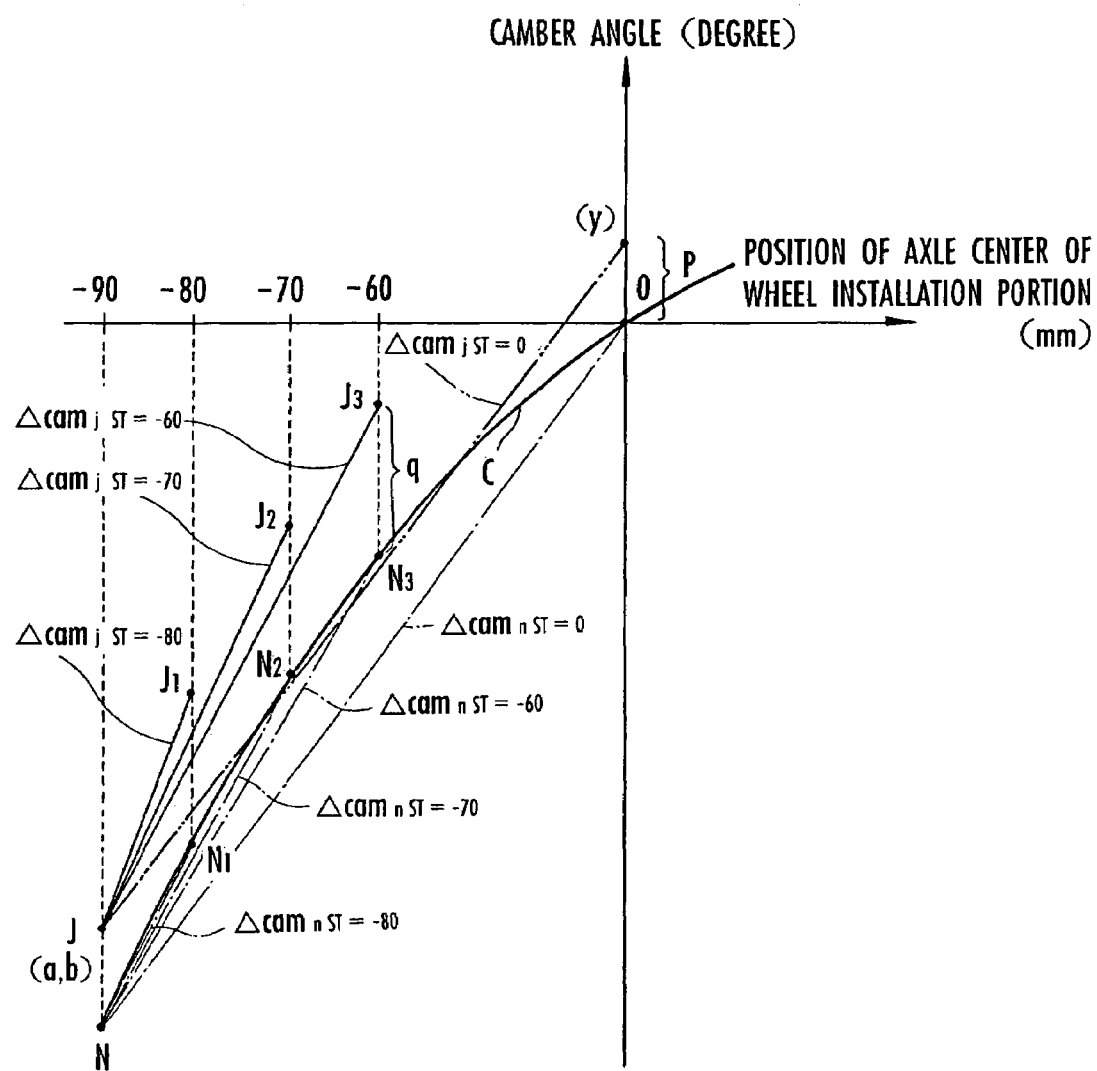
FIG. 12 is a graph showing a relationship between the position of a wheel installation portion and the camber angle thereof.

As shown in FIG. 12, it is supposed that a first reference coordinate point J is represented by coordinates (a, b) that indicate the camber angle b measured when the axle center position a of the wheel installation portion 5 is located at the position 90 mm lower than the position thereof in the finished vehicle state and corrected. Furthermore, it is supposed that a first measurement coordinate point $J_1$ is represented by coordinates (a, b) that indicate the camber angle b measured when the axle center position a of the wheel installation portion 5 is located at the position 80 mm lower than the position thereof in the finished vehicle state and corrected, a second measurement coordinate point $J_2$ is represented by coordinates (a, b) that indicate the camber angle b measured when the axle center position a of the wheel installation portion 5 is located at the position 70 mm lower than the position thereof in the finished vehicle state and corrected, and a third measurement coordinate point $J_3$ is represented by coordinates (a, b) that indicate the camber angle b measured when the axle center position a of the wheel installation portion 5 is located at the position 60 mm lower than the position thereof in the finished vehicle state and corrected.

Figure 11:
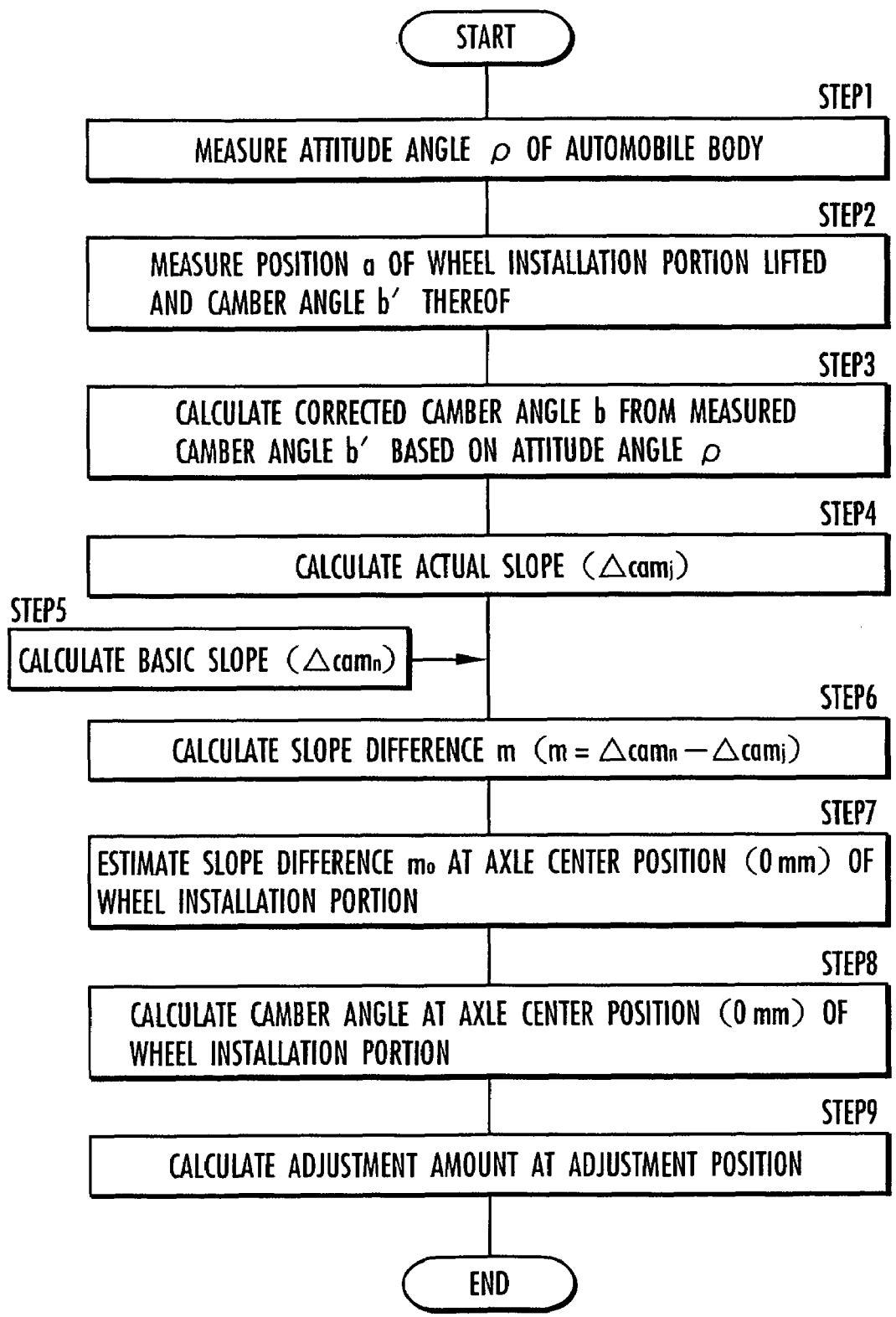
FIG. 11 is a flowchart showing a method of measuring a camber angle.

Then, as shown in FIG. 12, the slope of the line from the first reference coordinate point J to the first measurement coordinate point $J_1$ $\Delta cam_{jst=-80}$, the slope of the line from the first reference coordinate point J to the second measurement coordinate point $J_2$ $\Delta cam_{jst=-70}$, and the slope of the line from the first reference coordinate point J to the third measurement coordinate point $J_3$ $\Delta cam_{jst=-60}$ are calculated (see STEP 4 in FIG. 11). In the following, the slopes thus calculated will be referred to as actual slope ($\Delta cam_j$).

On the other hand, for various kinds of automobiles, the amount of variation of the proper camber angle with the lift of the wheel installation portion 5 by the wheel installation portion lifting means 6 is recorded in the calculation means in the form of a basic characteristic curve T as shown in FIG. 12. In the basic characteristic curve T, as shown in FIG. 12, it is supposed that a second reference coordinate point N is represented by coordinates that indicate the proper camber angle at the time when the axle center position of the wheel installation portion 5 is located at the position 90 mm lower than the position thereof in the finished vehicle state (or at the measurement starting position). Similarly, it is supposed that a first preset coordinate point $N_1$ is represented by coordinates that indicate the proper camber angle at the time when the axle center position of the wheel installation portion 5 is located at the position 80 mm lower than the position thereof in the finished vehicle state, a second preset coordinate point $N_2$ is represented by coordinates that indicate the proper camber angle at the time when the axle center position of the wheel installation portion 5 is located at the position 70 mm lower than the position thereof in the finished vehicle state, and a third reference coordinate point $N_3$ is represented by coordinates that indicate the proper camber angle at the time when the axle center position of the wheel installation portion 5 is located at the position 60 mm lower than the position thereof in the finished vehicle state. As shown in FIG. 12, the slope of the line from the second reference coordinate point N to the first preset coordinate point $N_1$ $\Delta cam_{nst=-80}$, the slope of the line from the second reference coordinate point N to the second preset coordinate point $N_2$ $\Delta cam_{nst=-70}$, and the slope of the line from the second reference coordinate point N to the third preset coordinate point $N_3$ $\Delta cam_{nst=-60}$ are previously calculated (see STEP 5 in FIG. 11) and recorded. In the following, the slopes previously recorded will be referred to as basic slope ($\Delta cam_n$).

Then, in STEP 6 in FIG. 11, the difference (m) between each actual slope ($\Delta cam_j$) and the corresponding basic slope ($\Delta cam_n$) is calculated.

$$m_{-80} = \Delta cam_{nst=-80} - \Delta cam_{jst=-80} \tag{11}$$

$$m_{-70} = \Delta cam_{nst=-70} - \Delta cam_{jst=-70} \tag{12}$$

$$m_{-60} = \Delta cam_{nst=-60} - \Delta cam_{jst=-60} \tag{13}$$

In this way, the slope differences $m_{-80}$, $m_{-70}$ and $m_{-60}$ are determined. From various kinds of tests, the inventor has found that the difference (m) between the actual slope ($\Delta cam_j$) and the corresponding basic slope ($\Delta cam_n$) varies with the axle center position of the wheel installation portion 5 in a certain manner. Based on this, the slope difference $m_0$ at the axle center position (0 mm) of the wheel installation portion 5 in the finished vehicle state is estimated from the calculated slope differences $m_{-80}$, $m_{-70}$ and $m_{-60}$ (see STEP 7 in FIG. 11).

Then, based on the value of the slope difference $m_0$, the camber angle y at the axle center position (0 mm) of the wheel installation portion 5 in the finished vehicle state is calculated from the formula (14) that represents the slope $\Delta cam_{jst=0}$ (a shift p from the coordinate of the proper camber angle is shown in FIG. 12) (see STEP 8 in FIG. 11).

$$y = \alpha(x - a) + b \tag{14}$$

In the formula (14), reference character α denotes the slope $\Delta cam_{jst=0}$ at the axle center position x of the wheel installation portion 5 in the finished vehicle state ($\alpha = \Delta cam_{nst\ =0} + m_0$). The camber angle y at the axle center position (x=0) of the wheel installation portion 5 in the finished vehicle state in the formula (14) can be represented by the formula (15).

$$y = -\alpha a + b \tag{15}$$

The camber angle y calculated here is one at the axle center position of the wheel installation portion 5 in the finished vehicle state. However, the position for adjusting the camber angle is 60 mm lower than the axle center position of the wheel installation portion 5 in the finished vehicle state. Thus, a correction amount y' associated with the adjustment position is added to the calculated camber angle as shown in the formula (16), thereby determining the adjustment amount q (see STEP 9 in FIG. 11).

$$q = y + y' = y + ky \tag{16}$$

The correction amount y' can be determined by multiplying the camber angle y by a correction coefficient k, which is previously calculated for the adjustment position of each model of automobile. Based on the adjustment amount q thus determined, the camber angle is adjusted at the adjustment position.

As described above, according to this embodiment, the camber angle of the wheel installation portion 5 can be measured and adjusted extremely quickly at the adjustment position (at the position 60 mm lower than that of the wheel installation portion in the finished vehicle state, according to this embodiment) without placing on the automobile body the same load as that placed thereon in a finished vehicle state. Furthermore, since the adjustment amount of the camber angle can be determined simply by lifting the wheel installation portion 5 to the adjustment position without making the automobile body 2 come off the hanger 1, the camber angle can be measured and adjusted efficiently, and the productivity can be improved. In addition, even if the automobile body 2 suspended by the hanger 1 is not in a horizontal position and inclined to the left or right by the attitude angle ρ, the camber angle can be calculated with accuracy.

The measurement starting position, the adjustment position and the measurement intervals described above can be appropriately determined based on the characteristics of the suspension unit of the automobile to be measured and are not limited to those used in the measurement of the toe angle and the camber angle according to this embodiment. In addition, the precision of the adjustment amount can be raised by shortening the measurement interval.

INDUSTRIAL APPLICABILITY

If the present invention is applied to measurement and adjustment of wheel alignment of an automobile, the wheel alignment can be measured and adjusted quickly and precisely without placing the same load on the wheel installation portion as that placed thereon during running, and thus the productivity can be improved.

The invention claimed is:

1. A method of measuring wheel alignment of an automobile carried in suspension through an automobile assembly line, a wheel installation portion yet to be fitted with a wheel being capable of being lifted and lowered while keeping an automobile body in suspension, comprising:

a wheel installation portion lifting step of lifting the wheel installation portion to a predetermined vertical position;

a measuring step of measuring a position of the wheel installation portion and an inclination angle of the wheel installation portion in a predetermined direction during lift in the wheel installation portion lifting step; and an inclination angle calculating step of calculating the inclination angle of the wheel installation portion in the predetermined direction in a finished vehicle state of the automobile from the measurement value obtained in the measurement step, wherein said measurement step further comprises: a deviation angle detecting step of detecting the deviation angle, in a predetermined direction, of the attitude of the automobile body supported in suspension with respect to a predetermined proper attitude of the automobile body at a measurement position; and a measurement value correcting step of correcting the measurement value of the inclination angle of the wheel installation portion in the predetermined direction based on the deviation angle detected in the deviation angle detecting step, and in said inclination angle calculating step, the inclination angle of the wheel installation portion in the predetermined direction in the finished vehicle state of the automobile is calculated using the inclination angle of the wheel installation portion in the predetermined direction corrected in the measurement value correcting step as said measurement value.

2. The method of measuring wheel alignment of an automobile according to claim 1, wherein the inclination angle of said wheel installation portion in the predetermined direction is a toe angle of said wheel installation portion, and the deviation angle detected in said deviation angle detecting step is a thrust angle of the automobile body, which indicates a horizontal deviation of the longitudinal center line of the automobile body supported in suspension from a predetermined proper longitudinal center line of the automobile body at the measurement position.

3. The method of measuring wheel alignment of an automobile according to claim 2, wherein the detection of the thrust angle of the automobile body in said deviation angle detecting step is performed simultaneously with the measurement of the position and the toe angle of the wheel installation portion being lifted.

4. The method of measuring wheel alignment of an automobile according to claim 2, wherein said inclination angle calculating step further comprises:

a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected in the measurement value correcting step, and the plurality of measurement coordinate points being specified by positions of the wheel installation portion measured at predetermined intervals until the wheel installation portion is lifted to said predetermined vertical position and toe angles of the wheel installation portion measured at the positions and corrected in said measurement value correcting step;

a second arithmetic step of calculating an estimated value of the toe angle of the wheel installation portion at a position thereof in the finished vehicle state of the automobile based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by said first reference coordinate point and a predetermined proper toe angle associated with the position, and the plurality of preset coordinate points being specified by the positions of the wheel installation portion designated by said measurement coordinate points and predetermined proper toe angles associated with the positions; and a third arithmetic step of determining the adjustment amount of the toe angle required to achieve a proper toe angle of the wheel installation portion at the position thereof in the finished vehicle state of the automobile based on the value obtained in the second arithmetic step.

5. The method of measuring wheel alignment of an automobile according to claim 1, characterized in that the inclination angle of said wheel installation portion in the predetermined direction is a camber angle of said wheel installation portion, and the deviation angle detected in said deviation angle detecting step is an attitude angle of the automobile body, which indicates a deviation, from the horizontal plane, of the lateral axis of the automobile body kept in suspension before measurement of the position and the camber angle of said wheel installation portion.

6. The method of measuring wheel alignment of an automobile according to claim 5, wherein said inclination angle calculating step further comprises:

a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the camber angle of the wheel installation portion measured at the position and corrected in the measurement value correcting step, and the plurality of measurement coordinate points being specified by positions of the wheel installation portion measured at predetermined intervals until the wheel installation portion is lifted to said predetermined vertical position and camber angles of the wheel installation portion measured at the positions and corrected in said measurement value correcting step;

a second arithmetic step of calculating an estimated value of the camber angle of the wheel installation portion at the position thereof in the finished vehicle state of the automobile based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by said first reference coordinate point and a predetermined proper camber angle associated with the position, and the plurality of preset coordinate points being specified by the positions of the wheel installation portion designated by said measurement coordinate points and predetermined proper camber angles associated with the positions; and a third arithmetic step of determining the adjustment amount of the camber angle required to achieve a proper camber angle of the wheel installation portion at the position thereof in the finished vehicle state of the automobile based on the value obtained in the second arithmetic step.

7. The method of measuring wheel alignment of an automobile according to claim 2, comprising:

a data extracting step of extracting predetermined data corresponding to the mounting state of a component constituting a suspension unit when calculating the toe angle in said inclination angle calculating step; and a determination step of determining whether the mounting state of the component constituting the suspension unit is appropriate or not based on the data extracted in the data extracting step.

8. The method of measuring wheel alignment of an automobile according to claim 7, wherein said inclination angle calculating step further comprises:

a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected in the measurement value correcting step, and the plurality of measurement coordinate points being specified by positions of the wheel installation portion measured at predetermined intervals until the wheel installation portion is lifted to said predetermined vertical position and toe angles of the wheel installation portion measured at the positions and corrected in the measurement value correcting step;

a second arithmetic step of calculating slope differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by said first reference coordinate point and a predetermined proper toe angle associated with the position, and the plurality of preset coordinate points being specified by the positions of the wheel installation portion designated by said measurement coordinate points and predetermined proper toe angles associated with the positions; and a third arithmetic step of determining the slope of a line that connects at least two of a plurality of coordinate points specified by the slope differences calculated in said second arithmetic step and the positions of the wheel installation portion associated with the respective slope differences and calculating the toe angle of the wheel installation portion at the position thereof in the finished vehicle state of the automobile based on the determined slope, and in said data extracting step, the slope calculated in said third arithmetic step is extracted as first data corresponding to the mounting state of the component constituting the suspension unit, a slope difference related to the position of the wheel installation portion in the finished vehicle state of the automobile is determined based on said first data and the slope differences calculated in said second arithmetic step, and the slope difference is extracted as second data corresponding to the mounting state of the component constituting the suspension unit.

9. The method of measuring wheel alignment of an automobile according to claim 8, characterized in that, in the case where the component constituting said suspension unit is a double-wishbone-type suspension that has an upper arm and a lower arm, in said determination step, it is determined based on said first data whether the vertical distance between the mounting points of the upper arm and the lower arm is appropriate or not, and it is determined based on said second data whether the distance along a wheel axle between the mounting points of the upper arm and the lower arm is appropriate or not.

10. The method of measuring wheel alignment of an automobile according to claim 3, wherein said inclination angle calculating step further comprises:

a first arithmetic step of calculating the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected in the measurement value correcting step, and the plurality of measurement coordinate points being specified by positions of the wheel installation portion measured at predetermined intervals until the wheel installation portion is lifted to said predetermined vertical position and toe angles of the wheel installation portion measured at the positions and corrected in said measurement value correcting step;

a second arithmetic step of calculating an estimated value of the toe angle of the wheel installation portion at a position thereof in the finished vehicle state of the automobile based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by said first reference coordinate point and a predetermined proper toe angle associated with the position, and the plurality of preset coordinate points being specified by the positions of the wheel installation portion designated by said measurement coordinate points and predetermined proper toe angles associated with the positions; and a third arithmetic step of determining the adjustment amount of the toe angle required to achieve a proper toe angle of the wheel installation portion at the position thereof in the finished vehicle state of the automobile based on the value obtained in the second arithmetic step.

11. A device for measuring wheel alignment of an automobile carried in suspension through an automobile assembly line, comprising:

automobile body supporting means that supports an automobile body in suspension while allowing a wheel installation portion yet to be fitted with a wheel to be lifted and lowered;

wheel installation portion lifting means that is disposed below the automobile body supported by the automobile body supporting means and lifts the wheel installation portion to a predetermined vertical position;

first measuring means that is provided on the wheel installation portion lifting means and measures a vertical position of the wheel installation portion;

second measuring means that is provided on said wheel installation portion lifting means and measures an inclination angle of the wheel installation portion in a predetermined direction;

deviation angle detecting means that detects a deviation angle, in a predetermined direction, of the attitude of the automobile body supported in suspension from a predetermined proper attitude of the automobile body;

measurement control means that allows the measurement of the vertical position by said first measuring means, the measurement of the inclination angle of the wheel installation portion in the predetermined direction by said second measuring means and the detection of the deviation angle of the automobile body by said deviation angle detecting means to be performed at predetermined intervals until the wheel installation portion is lifted from the position where the lift of the wheel installation portion by said wheel installation portion lifting means is started to a predetermined vertical position; and inclination angle calculating means that calculates the inclination angle of the wheel installation portion in the predetermined direction at the position thereof in a finished vehicle state of the automobile based on the measurement value obtained by said first measuring means, the measurement value obtained by said second measuring means and the angle detected by said deviation angle detecting means.

12. The device for measuring wheel alignment of an automobile according to claim 11, wherein the inclination angle of said wheel installation portion in the predetermined direction is a toe angle of said wheel installation portion, and the deviation angle detected by said deviation angle detecting means is a thrust angle of the automobile body, which indicates a horizontal deviation of the longitudinal center line of the automobile body supported in suspension from a predetermined proper longitudinal center line of the automobile body.

13. The device for measuring wheel alignment of an automobile according to claim 12, wherein said inclination angle calculating means comprises:

a first arithmetic means that calculates the slope of each of a plurality of lines that connect a first reference coordinate point with a plurality of measurement coordinate points, the first reference coordinate point being specified by the position of the wheel installation portion measured when the lift of the wheel installation portion is started and the toe angle of the wheel installation portion measured at the position and corrected based on the angle detected by said deviation angle detecting means, and the plurality of measurement coordinate points being specified by positions of the wheel installation portion measured at predetermined intervals until the wheel installation portion is lifted to said predetermined vertical position and toe angles of the wheel installation portion measured at the positions and corrected based on the angle detected by said deviation angle detecting means;

a second arithmetic means that calculates an estimated value of the toe angle of the wheel installation portion at the position thereof in the finished vehicle state of the automobile based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by said first reference coordinate point and a predetermined proper toe angle associated with the position, and the plurality of preset coordinate points being specified by the positions of the wheel installation portion designated by said measurement coordinate points and predetermined proper toe angles associated with the positions; and a third arithmetic means that determines the adjustment amount of the toe angle required to achieve a proper toe angle of the wheel installation portion at the position thereof in the finished vehicle state of the automobile based on the value obtained by the second arithmetic means.

14. The device for measuring wheel alignment of an automobile according to claim 11, characterized in that the inclination angle of said wheel installation portion in the predetermined direction is a camber angle of said wheel installation portion, and the deviation angle detected by said deviation angle detecting means is an attitude angle of the automobile body, which indicates a deviation, from the horizontal plane, of the lateral axis of the automobile body kept in suspension.

15. The device for measuring wheel alignment of an automobile according to claim 14, characterized in that said inclination angle calculating means further comprises:

a first arithmetic means that calculates the slope of each of a plurality of lines that connect a first reference coordinate point with a plurality of measurement coordinate points, the first reference coordinate point being specified by the position of the wheel installation portion measured when the lift of the wheel installation portion is started and the camber angle of the wheel installation portion measured at the position and corrected based on the angle detected by said deviation angle detecting means, and the plurality of measurement coordinate points being specified by positions of the wheel installation portion measured at predetermined intervals until the wheel installation portion is lifted to said predetermined vertical position and camber angles of the wheel installation portion measured at the positions and corrected based on the angle detected by said deviation angle detecting means;

a second arithmetic means that calculates an estimated value of the camber angle of the wheel installation portion at the position thereof in the finished vehicle state of the automobile based on the differences between the slopes of a plurality of lines that connect a previously calculated second reference coordinate point with a plurality of preset coordinate points and the slopes of the lines that connect the first reference coordinate point with the measurement coordinate points, the second reference coordinate point being specified by the position of the wheel installation portion designated by said first reference coordinate point and a predetermined proper camber angle associated with the position, and the plurality of preset coordinate points being specified by the positions of the wheel installation portion designated by said measurement coordinate points and predetermined proper camber angles associated with the positions; and a third arithmetic means that determines the adjustment amount of the camber angle required to achieve a proper camber angle of the wheel installation portion at the position thereof in the finished vehicle state of the automobile based on the value obtained by the second arithmetic means.

* * * * *